United States Patent [19]
Kohli et al.

[11] Patent Number: 5,897,605
[45] Date of Patent: Apr. 27, 1999

[54] SPREAD SPECTRUM RECEIVER WITH FAST SIGNAL REACQUISITION

[75] Inventors: Sanjai Kohli, Manhattan Beach; Steven Chen, Cerritos, both of Calif.

[73] Assignee: SiRF Technology, Inc., Santa Clara, Calif.

[21] Appl. No.: 08/638,882

[22] Filed: Apr. 25, 1996

Related U.S. Application Data

[60] Provisional application No. 60/013,514, Mar. 15, 1996.

[51] Int. Cl.$^6$ ............................. G01C 21/00; H04L 7/185
[52] U.S. Cl. .......................... 701/213; 701/214; 342/457; 375/200
[58] Field of Search ............................. 364/449.7, 449.8, 364/449.95, 447; 342/357, 457; 375/200, 343; 701/213, 214, 216, 205

[56] References Cited

U.S. PATENT DOCUMENTS

| | | |
|---|---|---|
| D. 314,713 | 2/1991 | Ciranny et al. ................... D10/61 |
| D. 314,963 | 2/1991 | Best et al. ....................... D14/188 |
| D. 343,383 | 1/1994 | Hall et al. ........................ D13/133 |
| D. 344,942 | 3/1994 | Gilman et al. ................... D14/155 |
| D. 346,170 | 4/1994 | Tang ................................ D14/230 |
| D. 347,436 | 5/1994 | Tang ................................ D14/230 |
| D. 354,451 | 1/1995 | Burrell et al. ................... D10/103 |
| D. 354,452 | 1/1995 | Burrell et al. ................... D10/103 |
| D. 361,569 | 8/1995 | Jervis ............................... D14/230 |
| D. 363,488 | 10/1995 | Shumaker ....................... D14/230 |
| D. 365,032 | 12/1995 | Laverick et al. ................. D10/78 |
| D. 365,292 | 12/1995 | Laverick et al. ................. D10/78 |
| 4,754,465 | 6/1988 | Trimble ............................. 375/1 |
| 4,758,959 | 7/1988 | Thoone et al. .................. 364/454 |
| 4,847,862 | 7/1989 | Braistad et al. ................... 375/1 |
| 4,890,233 | 12/1989 | Ando et al. ...................... 364/457 |
| 4,910,526 | 3/1990 | Donnangelo et al. ............ 342/455 |
| 4,922,212 | 5/1990 | Roberts et al. .................. 331/176 |
| 4,928,106 | 5/1990 | Ashjaee et al. .................. 342/352 |
| 4,965,586 | 10/1990 | O'Neill et al. ................... 342/357 |
| 4,970,523 | 11/1990 | Braisted et al. ................. 342/418 |
| 5,043,736 | 8/1991 | Darnell et al. .................. 342/357 |
| 5,075,694 | 12/1991 | Donnangelo et al. ........... 342/455 |
| 5,089,822 | 2/1992 | Abaunza et al. ................. 342/30 |
| 5,101,416 | 3/1992 | Fenton et al. ..................... 375/1 |
| 5,108,334 | 4/1992 | Eschenbach et al. ........... 455/314 |
| 5,111,150 | 5/1992 | Casey .............................. 328/155 |
| 5,119,101 | 6/1992 | Barnard ........................... 342/357 |
| 5,134,407 | 7/1992 | Lorenz et al. ................... 342/352 |
| 5,144,318 | 9/1992 | Kishi ................................ 342/357 |
| 5,146,471 | 9/1992 | Cowart .............................. 375/1 |
| 5,148,179 | 9/1992 | Allison ............................. 342/357 |
| 5,157,697 | 10/1992 | Anvari et al. .................... 375/102 |
| 5,165,109 | 11/1992 | Han et al. ........................ 343/700 |
| 5,173,715 | 12/1992 | Rodal et al. ..................... 343/795 |
| 5,187,450 | 2/1993 | Wagner et al. ................... 331/96 |
| 5,202,694 | 4/1993 | Farmer et al. ................... 342/357 |
| 5,202,829 | 4/1993 | Geier ................................ 364/449 |
| 5,210,540 | 5/1993 | Masumoto et al. .............. 342/357 |
| 5,219,067 | 6/1993 | Lima et al. ..................... 200/302.2 |
| 5,223,844 | 6/1993 | Mansell et al. .................. 342/357 |
| 5,225,842 | 7/1993 | Brown et al. .................... 342/357 |
| 5,239,669 | 8/1993 | Mason et al. ................... 455/12.1 |
| 5,247,469 | 9/1993 | McCune, Jr. .................... 364/721 |
| 5,265,025 | 11/1993 | Hirata .............................. 364/449 |

(List continued on next page.)

Primary Examiner—Michael Zanelli
Attorney, Agent, or Firm—Irell & Manella LLP

[57] ABSTRACT

A spread spectrum receiver, such as a GPS car navigation system, uses multiple, parallel correlations of data in a wide capture window, permits seamless tracking and rapid reacquisition of satellite signals at speeds sufficient to permit position information updates during momentary views available of satellites in intersections. The received data is processed in 11 bit samples, for a total of 186 time segments per 1 msec code period, which are each Doppler shifted and multiplexed into 12 channels. The code correlations are performed 22 times per channel by shifting the 11 bit locally generated code by one bit each correlation. The chip rate of the incoming data is $2f_0$ and the correlations are performed at $48f_0$ providing a time magnification advantage of 24.

11 Claims, 11 Drawing Sheets

U.S. PATENT DOCUMENTS

| | | | |
|---|---|---|---|
| 5,268,064 | 12/1993 | Woo et al. | 156/630 |
| 5,268,695 | 12/1993 | Dentinger et al. | 342/357 |
| 5,272,485 | 12/1993 | Mason et al. | 343/700 |
| 5,282,228 | 1/1994 | Scott et al. | 375/97 |
| 5,293,170 | 3/1994 | Lorenz et al. | 342/352 |
| 5,296,861 | 3/1994 | Knight | 342/357 |
| 5,306,971 | 4/1994 | McCune | 307/603 |
| 5,311,149 | 5/1994 | Wagner et al. | 331/1 A |
| 5,311,197 | 5/1994 | Sorden et al. | 342/457 |
| 5,313,069 | 5/1994 | Tham | 250/561 |
| 5,313,457 | 5/1994 | Hostetter et al. | 370/18 |
| 5,319,374 | 6/1994 | Desai et al. | 342/387 |
| 5,321,799 | 6/1994 | McCune, Jr. | 395/140 |
| 5,323,322 | 6/1994 | Mueller | 364/449 |
| 5,334,974 | 8/1994 | Simms et al. | 340/990 |
| 5,337,243 | 8/1994 | Shibata et al. | 364/449 |
| 5,345,244 | 9/1994 | Gildea et al. | 342/357 |
| 5,347,284 | 9/1994 | Volpi et al. | 342/356 |
| 5,347,536 | 9/1994 | Meehan | 375/1 |
| 5,347,546 | 9/1994 | Abadi et al. | 375/75 |
| 5,349,530 | 9/1994 | Odagawa | 364/449 |
| 5,355,140 | 10/1994 | Slavin et al. | 342/386 |
| 5,365,192 | 11/1994 | Wagner et al. | 330/252 |
| 5,365,451 | 11/1994 | Wang et al. | 364/449 |
| 5,365,516 | 11/1994 | Jandrell | 370/18 |
| 5,367,463 | 11/1994 | Tsuji | 364/449 |
| 5,375,059 | 12/1994 | Kyrtsos et al. | 364/449 |
| 5,383,127 | 1/1995 | Shibata | 364/449 |
| 5,390,207 | 2/1995 | Fenton et al. | 375/1 |
| 5,402,347 | 3/1995 | McBurney et al. | 364/443 |
| 5,402,450 | 3/1995 | Lennen | 375/343 |
| 5,406,491 | 4/1995 | Lima | 364/449 |
| 5,408,193 | 4/1995 | Rodal | 327/559 |
| 5,412,660 | 5/1995 | Chen et al. | 370/110.1 |
| 5,412,687 | 5/1995 | Sutton et al. | 375/202 |
| 5,414,729 | 5/1995 | Fenton | 375/209 |
| 5,416,712 | 5/1995 | Geier et al. | 364/450 |
| 5,418,537 | 5/1995 | Bird | 342/357 |
| 5,420,593 | 5/1995 | Niles | 342/357 |
| 5,422,813 | 6/1995 | Schuchman et al. | 364/449 |
| 5,422,814 | 6/1995 | Sprague et al. | 364/449 |
| 5,422,816 | 6/1995 | Sprague et al. | 364/449 |
| 5,424,953 | 6/1995 | Masumoto et al. | 364/449 |
| 5,430,654 | 7/1995 | Kyrtsos et al. | 364/449 |
| 5,432,841 | 7/1995 | Rimer | 379/59 |
| 5,436,632 | 7/1995 | Sheynblat | 342/357 |
| 5,448,773 | 9/1995 | McBurney et al. | 455/343 |
| 5,450,344 | 9/1995 | Woo et al. | 364/449 |
| 5,450,448 | 9/1995 | Sheynblat | 375/346 |
| 5,452,211 | 9/1995 | Kyrtsos et al. | 364/449 |
| 5,465,413 | 11/1995 | Enge et al. | 455/307 |
| 5,467,095 | 11/1995 | Rodal et al. | 343/700 |
| 5,469,360 | 11/1995 | Ihara et al. | 364/449 |
| 5,471,218 | 11/1995 | Talbot et al. | 342/357 |
| 5,479,351 | 12/1995 | Woo et al. | 364/449 |
| 5,485,161 | 1/1996 | Vaughn | 342/357 |
| 5,485,163 | 1/1996 | Singer et al. | 342/457 |
| 5,486,834 | 1/1996 | Lennen | 342/357 |
| 5,490,076 | 2/1996 | Rawicz et al. | 364/459 |
| 5,493,588 | 2/1996 | Lennen | 375/343 |
| 5,493,694 | 2/1996 | Vlcek et al. | 455/53.1 |
| 5,495,257 | 2/1996 | Loomis | 342/357 |
| 5,495,499 | 2/1996 | Fenton et al. | 375/205 |
| 5,504,491 | 4/1996 | Chapman | 342/357 |
| 5,537,121 | 7/1996 | Lennen | 342/357 |
| 5,541,845 | 7/1996 | Klein | 364/449 |
| 5,610,815 | 3/1997 | Gudat et al. | 364/424 |
| 5,612,972 | 3/1997 | Fukushi et al. | 375/206 |
| 5,619,212 | 4/1997 | Counselman, III | 342/357 |

SPREAD SPECTRUM RECEIVER WITH FAST SIGNAL REACQUISITION

CROSS REFERENCE TO RELATED APPLICATION(s)

This application claims the benefit of U.S. Provisional Application Ser. No. 60/013,514, filed Mar. 15, 1996.

BACKGROUND OF THE INVENTION

1. Field of the Invention

This invention relates in general to spread spectrum receivers and in particular to GPS navigation systems such as those used in terrestrial navigation for cars, trucks and other land vehicles.

2. Description of the Prior Art

Car navigation is conventionally performed using highway and street maps aided, to some degree, by distance measurements from external sensors such as odometers. Improvements over the last 10 years in Global Positioning System, or GPS, satellite navigation receivers has spawned several GPS car navigation systems.

Conventional GPS car navigation systems use the last known position of the vehicle, and the destination data, to compute a route data base, including route and turning data derived from a pre-existing map data base. GPS receivers are conventionally operated with a minimum of 3 or 4 satellites distributed across the visible sky in order to determine, or at least estimate, the four necessary unknowns including $x_{user}$, $y_{user}$ and $z_{user}$ which provide three orthogonal coordinates to locate the user as well as $t_{user}$ which provides the required satellite time. Techniques such as time or clock hold and altitude hold, in which the unknown time or altitude is assumed to remain predictable from a previously determined value, e.g. $z_{est}$ and/or $t_{est}$, have permitted operation of GPS receivers with less than 4 satellites in view. In particular, terrestrial GPS receivers have been operated with as few as 2 satellites to provide a 2 dimensional position solution using both clock and altitude hold.

Because continuous reception from 4 GPS satellites is often difficult to maintain in a car navigation environment, and known clock and altitude hold techniques can only permit operation with at least 2 satellites, known conventional car navigation systems have typically augmented the GPS position information with information from external sensors to provide dead reckoning information. The dead reckoning information is often provided by an inertial navigation system such as a gyroscope.

Augmenting GPS data with inertial navigation data has permitted the use of GPS car navigation even when less than 4 satellites are visible, such as in tunnels and in urban situations between tall buildings. However, the resultant increased complexity and costs for such combined systems have limited their acceptance.

Conventional GPS receivers use separate tracking channels for each satellite being tracked. Each tracking channel may be configured from separate hardware components, or by time division multiplexing of the hardware of a single tracking channel, for use with a plurality of satellites. In each tracking channel, the received signals are separately doppler shifted to compensate for the relative motion of each satellite and then correlated with a locally generated, satellite specific code.

During a mode conventionally called satellite signal acquisition, delayed versions of the locally generated code for the satellite being acquired are correlated with the doppler rotated received signals to synchronize the locally generated code with the code, as received for that satellite, by determining which delay most accurately correlates with the code being received. Once synchronization has been achieved for a particular satellite, that satellite channel progresses to a tracking mode in which the doppler rotated, received signal is continuously correlated with the locally generated code for that satellite to determine position information including pseudorange information. During tracking, conventional receivers also correlate the doppler shifted received signal with one or more versions of the locally generated code at different relative delays, such as one half C/A code chip width early and late relative to the synchronized or prompt version of the code. These early and late correlations are used to accurately maintain the synchronization of prompt correlation.

When, after tracking has begun for a particular satellite, the satellite signal has been lost so that the required timing of the locally generated code for synchronization is no longer accurately known, conventional receivers reenter the acquisition mode, or a limited version of this mode, to reacquire the satellite signals by multiple correlations to resynchronize the locally generated code with the code as received. Once the locally generated code has been resynchronized with the signals as received, position information data is again derived from the signals from that satellite.

What is needed is an improved spread spectrum receiver, for example, for use in a GPS system for terrestrial navigation which does not require the complexity or costs of conventional systems. In particular, a GPS receiver is needed which can make optimal use of signals available in difficult environments, such as urban environments, with less than 4 satellites continuously in view and frequent obscuration of signals from some of the satellites.

SUMMARY OF THE INVENTION

In a first aspect, the present invention provides an improved terrestrial navigation system using a GPS receiver which can continue to navigate with continuous GPS data from less than the 3 or 4 GPS satellites commonly required. The GPS data is augmented with data from another source. The source of the augmentation data may include data from external sensors, data bases including map data bases, and/or knowledge of the physical environment within which the vehicle is to be navigated. The use of such augmentation data permits GPS satellite navigation solutions for stand-alone GPS systems as well as for GPS systems integrated with external sensors and/or map databases with less than 3 or 4 continuously visible GPS satellites.

In another aspect, the present invention provides a GPS receiver in which map data used to determine routing is also used as a source of data augmentation for a single satellite solution by providing direction of travel information.

In still another aspect, the present invention provides a method of augmenting GPS data using information from the physical environment. For example, vehicles are usually constrained to tracks no wider than the width of the roadway—and often to tracks only half the width of the roadway—and trains are constrained to the width of their tracks. This cross track constraint data may be used to provide augmentation data and allow the vehicle to continue to navigate with only a single satellite in view. The cross track constraint data permits the computation of along track data useful for calculating total distance traveled to provide a GPS based odometer measurement.

The present invention permits the computation of distance along track for use as an odometer reading while tracking only one satellite. Cross track hold provides along-track data directly which, in the case of a vehicle, directly provides distance traveled information useful in lieu of a conventional odometer reading.

In addition to clock and altitude hold, the present invention uses a technique which may be called cross-track hold in which the single satellite in view is used for determining the progress of a vehicle such as a car along its predicted track, such as a roadway. The data conventionally required from a second satellite is orthogonal to the track and therefor represents the appropriate width of the roadway. This value may be assumed and or constrained to a sufficiently small value to permit an estimate of the value, e.g. $y_{est}$ to provide a mode described herein as cross-track hold while obtaining useful GPS navigation from a single satellite in view.

In other words, in accordance with the present invention, single satellite navigation may be achieved by using the data from the single satellite for on-track navigation information while holding or estimating the time, altitude and/or cross-track navigation data.

The required augmentation data may additionally, or alternatively, be derived from other sources in the physical environment, such as turns made by the vehicle during on-track travel. In accordance with another aspect of the present invention, the vehicle may detect turns made during travel and update the current position of the vehicle at the turn in accordance with the timing of the turn. Turn detection may be accomplished by monitoring changes in the vehicle vector velocity derived from changes in the GPS derived position information or by monitoring changes in the compass heading or by any other convenient means.

In another aspect, the present invention provides a GPS system for navigating a vehicle along a track, including means for tracking at least one GPS satellite to provide on-track information related to progress of the vehicle along a selected track, means for providing an estimate of cross track information related to motion of the vehicle perpendicular to the track, and means for providing vehicle navigation data, such as vehicle position or vehicle velocity, from the on-track information and the cross-track estimate.

In still another aspect, the present invention provides a method of deriving position information from a single GPS satellite by tracking at least one GPS satellite to provide on-track information related to progress of the vehicle along a selected track, providing an estimate of cross track information related to motion of the vehicle perpendicular to the track, and determining the position of the vehicle from the on-track and the cross-track estimates.

In still another aspect, the present invention provides a method of updating GPS position information for a vehicle navigating on roadways by deriving an indication that the vehicle has made a turn at a particular point along a predetermined track, comparing the turn indication with stored navigation data to select data related to one or more predicted turns at or near the particular point, comparing the turn indication with the predicted turn data to verify that the indicated turn corresponds to the predicted turn, and updating GPS position information to indicate that the vehicle was at the predicted turn location at a time corresponding to the turn indication.

In still another aspect, the present invention provides a GPS system for navigating a vehicle, the system including means for tracking at least one GPS satellite to provide on-track information related to the direction of travel of the vehicle along a selected track, and means for deriving vehicle navigation data from changes in the direction of travel of the vehicle along the selected track.

In a still further aspect, the present invention takes advantage of the typical improvement in satellite visibility possible in urban roadway intersections by providing a fast satellite reacquisition scheme which permits data from otherwise obscured satellites to aid in the navigation solution even though visible only for a short time, for example, as the vehicle crosses an intersection in an urban environment in which tall buildings obscure the satellites from view except in the intersection.

In a further aspect, the present invention provides a spread spectrum receiver having means for providing a plurality of versions of a locally generated signal related to a spread spectrum signal to be received, means for combining at least two of the versions of the locally generated signal with the spread spectrum signal to produce a product signal related to each of the at least two versions, means for evaluating the at least two product signals to adjust a parameter of the third version of the local signal, means for combining the adjusted third version of the local signal with the spread spectrum signal to produce a data signal, means for determining a predicted value of the parameter when the spread spectrum signal becomes unavailable, means for combining an additional plurality of versions of the locally generated signal related to the predicted value with received signals to produce additional product signals related to each of the additional plurality of versions of the locally generated signal, means for evaluating the additional product signals to produce a reacquired data signal.

In another aspect, the present invention provides a method of operating a receiver for coded GPS signals from satellites by correlating early, prompt and late versions of a locally generated model of the code with signals received from GPS satellites to adjust a delay of the prompt version to track a selected satellite, maintaining a predicted value of the delay when the selected satellite is unavailable, correlating a plurality of different early versions of the locally generated code with signals received from satellites to produce correlation products, correlating a plurality of different late versions of the locally generated code with signals received from satellites to produce correlation products, and reacquiring the previous unavailable selected satellite by selecting the version producing the largest correlation product above a predetermined threshold as a new prompt version of the code to track the satellite.

In a still further aspect, the present invention provides a spread spectrum receiver for a spectrum spreading code having a fixed number of bits repeated during a fixed length time period from a plurality of transmitters having a first time slicing level for slicing the time period of the transmitted code into a number of time segments evenly divisible into the twice the number of samples, a second multiplexing level for dividing each time segment into a number of channels, each of the channels being used for tracking one of the transmitters, and a third level dividing each of the channels in one of the segments into a number of code phase delay tests.

In another aspect, the present invention provides a receiver for processing signals from a plurality of sources, each modulated by a different spectrum spreading code repeating at a common fixed interval, including a sampler for deriving digitally filtered I and Q samples from a composite of spread spectrum signals received from the plurality of sources, means for segregating samples of the signals being received during each interval into a number of time segments, a time division multiplexer for segregating different versions of the sequential samples into each of a number of channels, each channel representing one of the plurality of sources, a correlator for correlating the version of the sample in each channel with a series of sequentially delayed versions of the spectrum spreading code applied to the signals from the source represented by that channel, and an accumulator associated with each of the series of delays in each of the channels for processing the results of correlations performed during one or more intervals to derive information related to the signals.

These and other features and advantages of this invention will become further apparent from the detailed description and accompanying figures that follow. In the figures and description, numerals indicate the various features of the invention, like numerals referring to like features throughout both the drawings and the description.

DETAILED DESCRIPTION OF THE PREFERRED EMBODIMENT(s)

Figure 1:
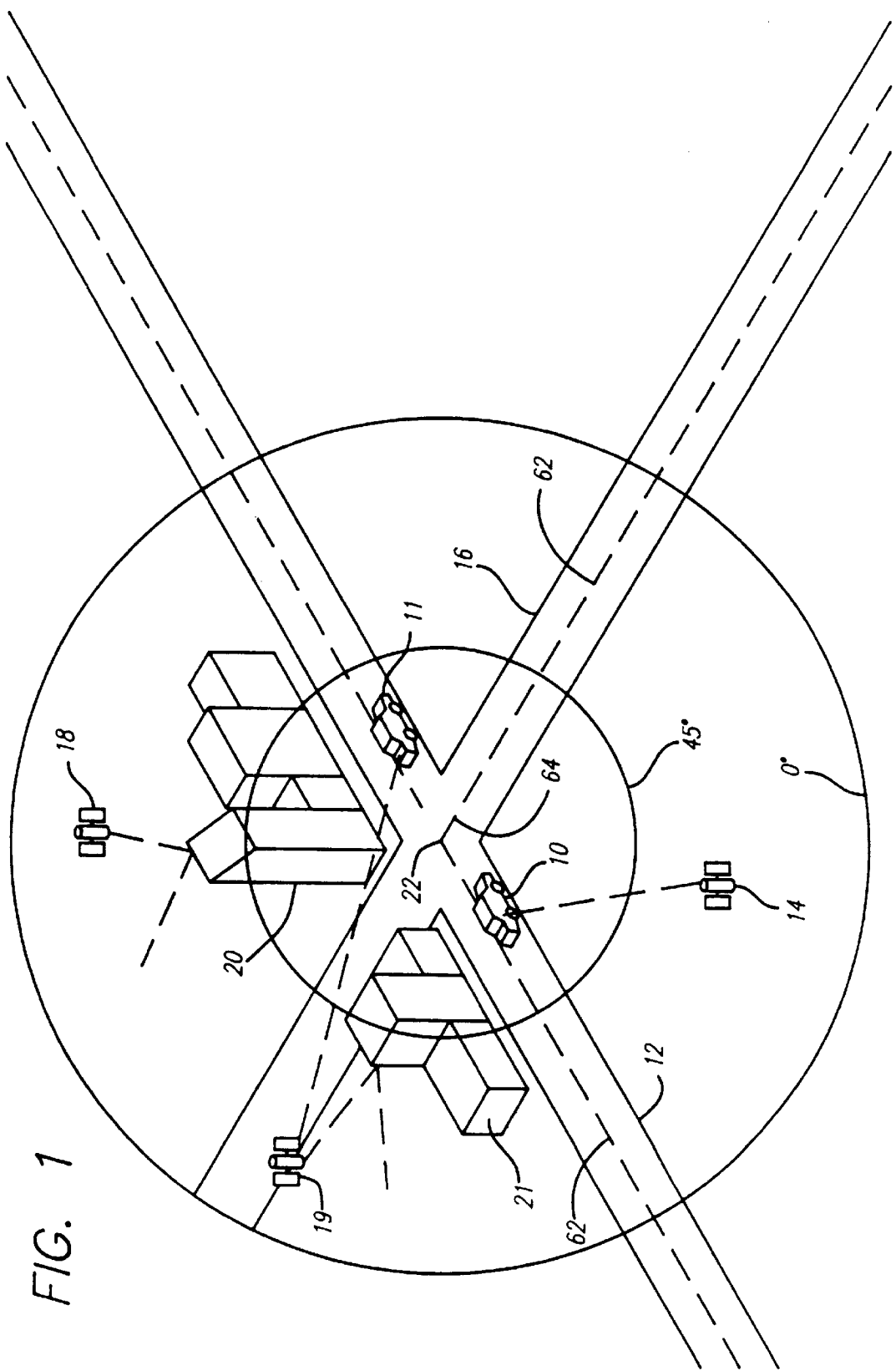
FIG. 1 is an overview illustration of the operation of a car navigation system according to the present invention.
Figure 2:
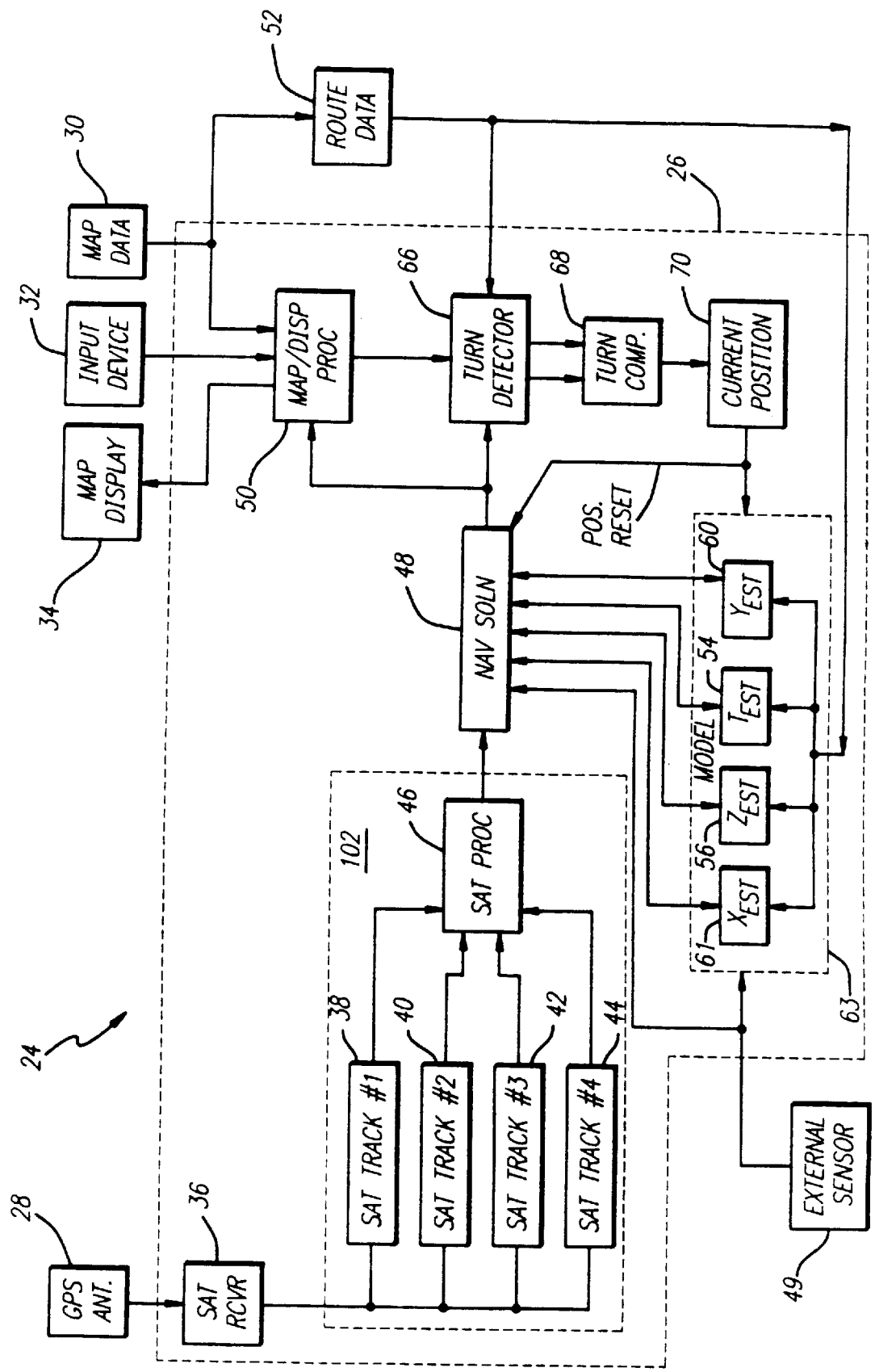
FIG. 2 is a block diagram of the GPS car navigation system depicted in FIG. 1, used for improved navigation during reduced satellite visibility.

FIG. 1 is an overview illustration of the operation of a GPS car navigation system according to the present invention. The GPS car navigation system, described below in greater detail with respect to FIG. 2, is mounted in car 10 which is moving along the center of roadway 12. NAVSTAR satellite 14, in the lower left quadrant of the figure, is in view of car 10. A simulated GPS circular overhead display, positioned approximately over intersection 22 of roadway 12 and roadway 16 indicates that satellite 14 is between 0° and 45° degrees of elevation above the horizon as viewed from car 10.

For the purposes of illustration, satellite 18 is positioned overhead between the elevation angles of 0° and 45° degrees. However, the line of sight between satellite 18 and car 10 is obscured by buildings 20 so that satellite 18 is not in view of car 10 at the position along roadway 12 as shown. Similarly, the line of sight between satellite 19 and car 10 is obscured by buildings 21. However, as will be discussed below, when car 10 crosses intersection 22, the line of sight between satellite 19 and car 10, when the car is in position 11 within intersection 22, may momentarily be clear.

Turning now to FIG. 2, GPS car navigation system 24 is a first embodiment of a car navigation system according to the present invention which may be installed in car 10 of FIG. 1. GPS car navigation system 24 includes GPS car system module 26 which is provided with signals received from satellites by GPS antenna 28, data related to the then current—and expected future—physical environment of car 10 by for example map data base 30 and data input from the operator of the car by for example input device 32. GPS car system module 26 provides output to the operator, for example, in the form of a GPS map display, via display unit 34, which may include both visual display as well as a voice interface announcing information as required to supplement or even partially replace visually presented data.

The present invention may be configured for use with only a GPS receiver, a GPS receiver aided by map data from, for example, map data base 30, and/or a GPS receiver aided by both a map data base as well as an external source of information, for example, from an external sensor. This external source of information may be used for maintaining position-information by dead reckoning during those times when a sufficient number of satellites are not in view to provide the desired information.

In operation, a composite of all signals received from NAVSTAR satellites is applied by GPS antenna 28 to satellite receiver section 36 of GPS car system module 26. Signals from individual NAVSTAR satellites are then tracked in satellite specific tracking channels such as Sat-TRAK channels 38, 40, 42 and 44. Although it is quite conventional to track 4 to 12 satellites and therefore use 1 to 12 satellite tracking channels, only 4 such channels are shown herein for clarity. The outputs of these satellite specific tracking channels are processed by SatProcessor 46 to provide $x_{user}$, $y_{user}$, $z_{user}$ and $t_{user}$ data via appropriate logic control to a GPS position processor, such as PosProcessor or Nav Soln 48 which determines the navigation solution to determine position data. Position data is then applied by PosProcessor 48 to an appropriate display for the operator of the car, such as display unit 34.

External sensor 49, in FIG. 2, may conveniently provide sensor data, or local or satellite position information, or position information which provided local position or satellite position information directly to PosProcessor 48 for comparison with the position information determined by SatProcessor 46 and/or Map/Display Processor 50. External sensor 49 may conveniently be any sensor which provides information useful for updating position information for dead reckoning including direction, speed, velocity or acceleration or other data from which dead reckoning data may be derived. Conventional sensors include inertial navigation systems, with magnetic or optical gyroscopes, fluxgate compasses, odometer or wheel sensors or the like. Alternatively, external GPS format signals, such as those provided by a pseudolite, may be used to update current satellite or position information.

At the beginning of a navigated trip, the operator of car 10 would typically provide data concerning the physical environment surrounding the intended route to GPS car system module 26 by inserting an appropriate data storage device such as a CD ROM, into map data base 30, and/or by entering the data via input device 32 which conveniently may be a keypad, keyboard, pointing device, track ball, touch screen, graphical pad, a voice recognition interface and/or a combination of such input devices. The operator of car 10 would also enter the intended destination into GPS car system module 26 via a data entry device such as a mouse or track ball interacting with display unit 34 and/or via input device 32. Map/Display Processor 50 of GPS car system module 26 would then develop the desired route, typically from the then current location as a point of origin to the desired destination, in accordance with the rules of navigation and details of the locale provided by map data base 30. The appropriate route data is stored in Route Data Base 52, including the routing in the form of roadways and turns between roadways. Additional information, such as altitude, width of the roadways and etc. may also be contained within map data base 30 and/or Route Data Base 52. These data bases may be contained within GPS car navigation system 24 and/or made available to GPS car system module 26 from outside storage media such as diskettes positioned in appropriate disk drives.

During navigation, each satellite in view may be tracked in a satellite tracking channel. If, for example, 4 or more satellites are in view, each of the satellites in view will be tracked in an individual channel, such as SatTRAK channels 38, 40, 42 and 44. The output of the satellite tracking channels is then applied to SatProcessor 46 which would provide satellite based solutions of the four unknowns, such as $x_{user}$, $y_{user}$, $z_{user}$ and $t_{user}$. The data represented by $x_{user}$ and $y_{user}$ are conventionally used as the two dimensional orthogonal components of the surface of the earth such as north and east. However, in accordance with the present invention, $x_{user}$ and $y_{user}$ are preferably used to represent data for a pair of orthogonal directions specific to the direction of vehicle travel called the on-track and cross-track directions.

Conventional bearing, such as north, south, east and west are relative to the magnetic or true north poles of the earth, while on-track and cross-track, as used in the present invention, are bearings made relative to the expected direction of travel of car 10 at any particular point in the route. For example, while a 90° turn from a heading of due north would change the angle of the vehicle velocity vector from 0° to 90° if bearings relative to the Earth's surface such as north and east are used, the same turn would show no change in the 0° angle of the vehicle velocity vector before or after the turn as long as car 10 remained on the expected track.

The data represented by $z_{user}$ is typically surface elevation, such as the elevation above sea level, while the data represented by $t_{user}$ is the exact time as determined from one or more of the satellite tracking channels.

Solutions for all 4 unknowns of position information may be derived from signals from 4 satellites in view, so that exact position information within the limit of the accuracy then available from the GPS satellite constellation in view can therefore be applied by PosProcessor 48 to Map/Display Processor 50. The position information determined from the satellites is processed with the physical data from map data base 30, and/or the desired routing data from Route Data Base 52, to provide appropriate navigation information to the operator of car 10 via display unit 34.

If less than 4 satellites are in view, the $t_{user}$ solution applied to PosProcessor 48 may be replaced by $t_{est}$ 54 estimated solution derived for example from an internal clock model 54 in position estimate or model 63. Similarly, the $Z_{user}$ solution may be replaced by $z_{est}$ 56 solution derived from elevation estimate 56, also in position model 63, in accordance with routing data derived from Route Data Base 52 in accordance with then current GPS position information applied to Map/Display Processor 50. $T_{est}$ 54 and $z_{est}$ 56 are applied to PosProcessor 48, and used in lieu of $t_{user}$ and $z_{user}$, when only two satellites are in view. The use of estimated or modeled solutions for the t and z variables, that is the use of $t_{est}$ 54 and $z_{est}$ 56 are conventionally known as clock hold and altitude hold, respectively.

It must be noted that the particular configuration of GPS car navigation system 24 as described so far is only one of the many known ways of configuring such systems any of which may be used without departing from the spirit or scope of the present invention as defined by the claims.

In accordance with the present invention, the width of the roadway, either known or estimated, may be used to provide $y_{est}$ 60 for use in lieu of $y_{user}$ when only one satellite is visible. $y_{est}$ 60 may be derived from Route Data Base 52 and/or map data base 30. Since the x and y unknowns are orthogonal, $x_{user}$ may be used to describe the on-track information, that is, the progress of car 10 along its predetermined track while $y_{est}$ 60 represents the cross track information, that is, how far car 10 has strayed from the center of the roadway.

Referring therefore to FIG. 1, $x_{user}$ is used to indicate the progress of car 10 along roadway 12 while $y_{est}$ 60 is used to represent the width of roadway 12. The actual width of the roadway may be derived from map data base 30, or assumed because the actual value of the width of the roadway is relatively small and often therefore insignificant compared to the distances to be measured along the navigation route. Since the maximum allowable cross-track error, i.e. the maximum allowable appropriate value for y, is constrained by the physical width of the roadway, $y_{est}$ 60 is relatively easy to accurately estimate.

By using $y_{est}$ 60, $z_{est}$ 56 and $t_{est}$ 54, it is possible to provide useful navigation data for car 10 along a known roadway using signals from only a single satellite in view. It is important to note that reasonably accurate prior or initial position information may be required and that not all visible NAVSTAR satellites will be suitable for single satellite navigation, depending upon the position of the satellite with respect to the path of car 10. The position information determined during single satellite navigation is along track position information which may be accumulated and used for determining accumulated along track distance traveled. This data provides, and may be used in place of, the distance traveled information conventionally provided in a vehicle by an odometer.

Referring now to both FIGS. 1 and 2, turning data may be used to improve terrestrial GPS navigation by using the detection of a known turn to update progress along a predetermined route. When at least 4 satellites are in view, the position of car 10 may be known to the accuracy of the GPS system. When using clock, altitude or cross-track hold, or some combination thereof, the known position of the car is degraded by any inaccuracy of the estimate or estimates used. For example, during clock hold, internal clock model 54 drift and inaccuracy of the source of $t_{est}$ 54 will degrade the accuracy to which the position is known as a function of the magnitude of the inaccuracy. Similarly, any change in altitude from the estimated or fixed altitude, that is, any inaccuracy of $z_{est}$ 56, will degrade the accuracy of the known position. Changes in roadway width and inaccuracies in the map data with regard to the roadway width, that is, any inaccuracy in $y_{est}$ 60, may also degrade the position information.

Even with 4 satellites in view, the geometry of the visible satellites may make it difficult to determine position by measurement of GPS signals. Further, during terrestrial navigation, it is not uncommon for satellites to be temporarily obscured from view during navigation by, for example, being blocked by buildings and other obstructions.

It may therefor be desirable to update the accuracy with which the current position of the vehicle is known with actual position information whenever possible. The update information will sometimes be useful when 4 satellites are in view, but will always be useful as supplemental data when less than 4 satellites are in view. Update information is extremely useful during single satellite navigation to avoid the accumulation of errors in position information.

In operation, an original position and a destination were provided to the system which then determined the track to be followed. The track to be followed, or routing information, may be provided in the form of a data base of route information such as Route Data Base 52. In the example used, track 62 follows the centerline of roadway 12 to intersection 22 and then makes turn 64 to follow the centerline of roadway 16. Track 62, roadways 12 and 16, intersection 22 and turn 64 are provided to Route Data Base 52 during the preparation of the route by Map/Display Processor 50 from the then current position and the destination entered via input device 32.

The physical position of car 10 is very accurately known when car 10 turns at turn 64. This accurate knowledge of the car's position at a particular time may conveniently be used to update the GPS navigation information by providing a position reset which is similar to a known initial position. Update information from turns will most likely be useful if the angle of turn 64 is sufficiently large to provide an unambiguous position determination. It is expected that any turn greater than 45° may be detected. As the speed of the vehicle increases, smaller turn angles may also provide useful information. The position update information is applied to position model 63 to update internal clock or $t_{est}$ model 54, elevation or $z_{est}$ model 56, $y_{est}$ model 60 as well as $x_{est}$ 61 which is a model of the along-track position of the car. These four estimates together for position model 63, which may be updated by information from map data base 30, Route Data Base 52, current position processor 70, PosProcessor 48 and/or external sensor 49, to form the most accurate available position model 63. Position model 63 may also be used to provide estimates to the same data sources.

The actual turning of the car may be detected by a change in the vehicle velocity vector determined from the GPS data or from other conventional means such as a magnetic compass or an inertial navigation sensor. In accordance with the rapid reacquisition system described below with respect to FIG. 3, GPS data alone may conveniently detect such turns even when single satellite navigation is required. The turn as detected by turn detector 66 is correlated with data from Route Data Base 52 to determine the actual position of the car to the accuracy of the map data base 30. The accuracy of the data in map data base 30 may easily and conveniently be much greater than the accuracy available from the GPS system especially if single satellite navigation, or any combination of clock, altitude or cross-track hold, is used. Therefore the position update may provide a substantial increase in the accuracy of the then current position determination.

The benefit of the approach of this embodiment of the present invention is similar to the identification and use of a known waypoint during a dead reckoning navigation run. The cumulative error is reduced substantially at the known waypoint so that additional, future position determination errors do not carry the burden of an accumulation of past errors.

As shown in FIG. 2, Route Data Base 52 provides data related to track 62, typically from Map Data Base 30, to Map/Display Processor 50 to display the current GPS position and may also provide similar information to turn detector 66, turn comparator 68 and/or current position processor 70 in order to update PosProcessor 48 with a position reset.

Turn detector 66 may be configured in many different ways and is used to detect turns actually made by car 10 and select turns, such as turn 64, from Route Data Base 52 for later comparison with the detected turn. In accordance with a preferred embodiment of the present invention, turn detector 66 may operate on the current GPS position provided by PosProcessor 48 to develop a vehicle velocity vector position indicating both the direction and speed of travel. Substantial changes in the direction portion of the vehicle velocity vector would indicate a change in direction, such as a turn. Turn detector 66 may therefore detect turns directly from the GPS information by determining the vehicle velocity vector and detecting changes in the vehicle velocity vector which represent a turn.

Turn detector 66, or another unit if convenient, also operates on the route information provided by Route Data Base 52 to determine the expected position of car 10 along track 62 based on the then current GPS position information. Once the expected location of car 10 along the route is determined, one or more turns in the area of the expected position of car 10 can be selected for comparison with the indications of a physical turn derived from the GPS data.

When changes in the actual vehicle velocity vector, as derived for example from the GPS position data, compare appropriately with the changes predicted at a particular turn as derived from Route Data Base 52, the actual position of car 10 at the time of the turn can be very accurately determined and used to update the GPS data at the turn. For example, if an actual turn is detected from a change in the vehicle velocity vector from the GPS position of car 10 near the time predicted for that turn, the actual position of car 10 at the time of the turn can be determined and used to update the then current GPS position for use as a position reset applied to PosProcessor 48.

Alternatively, turn detector 66 may use non GPS measurements for determining the occurrence of an actual turn of car 10, such as compass headings or inertial navigation determinations derived for example from external sensor 49, and applied directly to turn detector 66 or via PosProcessor 48 as shown in FIG. 2.

Detection of turns from GPS signals may easily be accomplished as long as 2 satellites are in view and provide appropriate geometries for determining two dimensional coordinates of the car's position. During single satellite navigation, as described above, the use of turn information for updating the last known position information becomes even more important, but the location of the single satellite in view, relative to track 62, becomes of even greater importance so that actual turns may be accurately detected.

Turn detection may also be provided by monitoring changes between acquired and obscured satellites. If, for example, only satellite 14 was visible to car 10 on roadway 12 before intersection 22, and upon entering intersection 22, satellite 19 suddenly became visible while satellite 14 was momentarily obscured, the change over from satellite 14 to satellite 19 could be used to indicate a turn in accordance with the data from each satellite. Using a rapid reacquisition scheme, as described herein below, the actual position at which the change of direction, that is, the switch between satellites, can be sufficiently accurately determined to permit precise position update information at the turn.

Similarly, turn comparator 68 may conveniently be implemented within another component of the system, such as PosProcessor 48, Map/Display Processor 50 and/or SatProcessor 46, so that a candidate turn may be selected from the route data for track 62 for comparison with the detected turn data.

Figure 3:
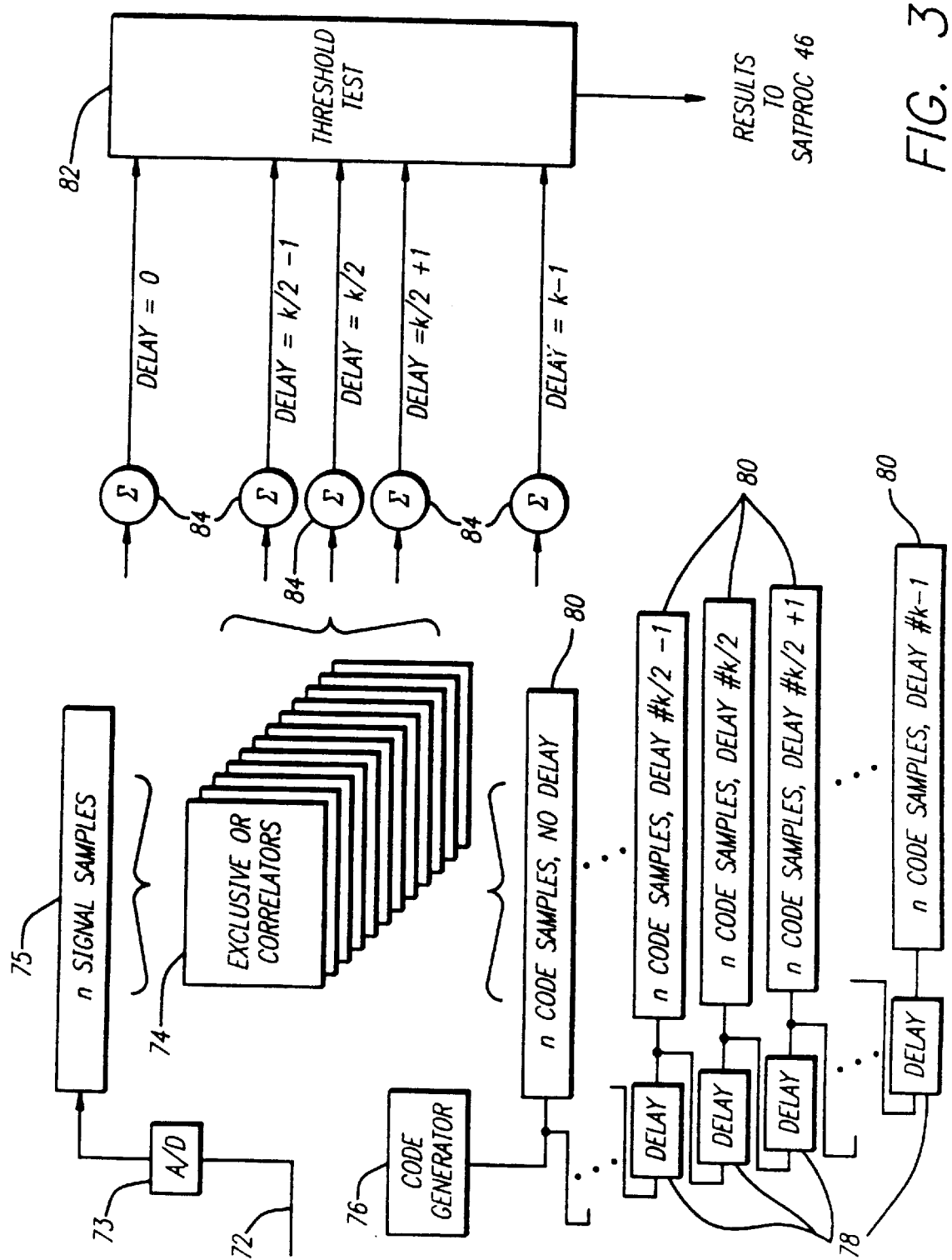
FIG. 3 is a schematic representation of a single satellite channel of a GPS receiver used for fast satellite reacquisition.

Referring now to FIG. 3, in another embodiment, the present invention provides for fast reacquisition of satellite signals, useful for example when a previously acquired satellite is obscured and then appears perhaps for only a short time, for example, as a car travels through an intersection.

Referring to the line of sight between car 10 and satellite 19 as shown in FIG. 1, it is common in an urban environment for the buildings along the sides of the street to act as a barrier wall obscuring the lines of sight to many GPS satellites. However, the barrier wall formed by buildings 20 and 21 is commonly breached at intersections such as intersection 22. For example, car 10 while traversing intersection 22 may reach position 11 in which the previously obscured line of sight to a satellite, such as satellite 19, is momentarily not obscured because of the break between buildings 20 and 21 at intersection 22. This momentary visibility of a previously obscured satellite may occur while car 10 is in the intersection or at the edges of the intersection.

The length of the momentary contact with satellite 19 is relatively short. For example, if intersection 22 is 60 feet wide and car 10 is traveling at 30 mph, the time taken to cross the intersection may be as short as 1.3 seconds. Conventional GPS navigation systems would not reacquire and derive useful data from satellite 19, even if previously acquired, during this short time interval.

In accordance with another embodiment, the present invention makes maximum use of such reacquisition opportunities by minimizing the time required for reacquisition, the collection of data and processing of the collected data for position determination. Referring now to FIG. 3, a portion of SatTRAK channel 38 is shown in greater detail as an example of the configuration of each of the satellite tracking channels. After original acquisition, SatTRAK channel 38 tracks a single satellite by operating on satellite signals 72 received by GPS antenna 28. Satellite signals 72 include the signals from the satellite being tracked by SatTRAK channel 38 and are demodulated and selected by being multiplied, in one of the correlators 74, by a copy of the 1023 chip pseudorandom, spread spectrum code applied to satellite signals 72 by the GPS satellite. Correlators 74 may be configured from exclusive OR or NOR gates to minimize the time required for providing a correlation result.

During tracking, the copy of the code produced by code generator 76 and applied to exclusive OR correlators 74 by delay 78 is synchronized with the code in satellite signals 72, as received, so that the copy of the code correlates with satellite signals 72. This may be accomplished in several different manners known in the art, including by shifting the time of generation of the code in code generator 76 and/or adjusting the amount of delay applied by an external delay. In any event, the code applied to exclusive OR correlators 74 when SatTRAK channel 38 is locked to the selected satellite, is synchronized with the code being received from that selected satellite. This correlation is commonly called the on-time or prompt correlation to indicate this synchronization.

Conventional GPS receivers maintain a lock on a satellite signal after acquisition by performing additional correlations, often called early and late correlations or correlations performed by early and late correlators. These correlations are displaced in time by a certain delay such as one half the width of a C/A code chip from the on-time or prompt correlator. That is, if the time of occurrence of a particular chip in the satellite signals is time t0, the prompt correlator under ideal conditions would multiply satellite signals 72 with a replica of the code with the same chip at time t0. The early correlation would be performed at time t0−½ chip and the late correlation would be performed at a time equal to t0+½ chip. Whenever the synchronization between code generator 76 and satellite signals 72 as received begins to drift, the correlation results begin to change in favor of either the early or late correlation at the expense of the prompt correlation.

One conventional approach to maintaining lock on the signals from a particular satellite is to adjust the timing of code generator 76 with a feed back loop used to maintain the power in the correlation products in the early and late correlators to be equal. In this way, code generator 76 may be continuously resynchronized with satellite signals 72 so that the accuracy of the system is within one half chip in either direction (early or late) of the signals received.

When satellite signals 72 are temporarily lost, for example, because the satellite signals are temporarily obscured by buildings 20 and 21 as shown in FIG. 1, various techniques are used to attempt to synchronize code generator 76 with satellite signals 72 as received so that SatTRAK channel 38 can reacquire the signals from the desired satellite. As noted above, conventional techniques include clock and altitude hold and one embodiment of the present invention provides another technique called cross-track hold.

However, unless the obscuration of the satellite signals is very brief, the accuracy of prediction of such techniques is not enough to maintain synchronization exception for a very brief period of obscuration.

In accordance with another embodiment of the present invention, massively parallel correlation is used to create an expanded capture window of correlation capture around the then current predicted synchronization time in order to immediately reacquire a previously acquired, and then obscured, satellite signal. In particular, the speed of reacquisition is made sufficiently fast according to the present invention so that useful GPS position data may be acquired during the time car 10 travels through intersection 22 even though, for example, the signals from satellite 19 were obscured by buildings 20 until car 10 was within intersection 22.

To this end, an expanded series of correlations are performed with a series of delays a fixed fraction of a chip width, such as ½ chip width, apart extending both early and late of the predicted prompt correlation. As shown in FIG. 3, satellite signals 72 are devolved into a fixed number of samples, by for example analog to digital conversion in A/D Converter 73, to provide n Signal Samples 75. A similar number of code samples are provided through k fixed ½ chip width delays 78 to provide k−1 sets of n Code Samples 80, progressing from a first set of n Code Samples 80 with no delay to the k−1st set of n Code Samples 80 which have been delayed by a total of k delays 78. It is convenient to use ½ chip delays for each delay 78, but other fractions of a chip width may be used.

The k/2th set of n Code Samples 80, or the set nearest k/2, may conveniently be delayed the correct amount to perform the prompt correlation in one of the exclusive OR correlators 74 with n Signal Samples 75 from A/D Converter 73 during tracking. The k/2th−1 set of n Code Samples 80 may then be used to perform the early correlation while the k/2th+1 set of n Code Samples 80 may then be used to perform the late correlation while tracking. The additional correlations may also be performed during tracking, but provide a substantial advantage when used during reacquisition.

That is, in the present invention, the early, prompt and late correlations conventionally used in tracking may also be used during reacquisition mode, aided by a substantial number of correlations using additional delays. Whether or not the early and late correlations are used, a convenient number of additional delays on each side of the prompt delay results from (k−1)=20 so that nine or ten ½ chip delays are provided on each side of the k/2th prompt delay. In this way, correlations are performed during reacquisition at time delays of 5 chip widths on either side of the predicted prompt or on-time delay. This represents an expanded capture window of on the order of ±5×300 meters of potential error. That is, if the predicted synchronization with satellite signals 72 modeled by GPS car system module 26 drifted by as much as the equivalent of a ±1500 meter position error during signal loss from a particular satellite resulting from, for example obscuration in an urban setting, at least one of the plurality of exclusive OR correlators 74 would provide the required prompt correlation to immediately lock onto satellite signals 72.

Once the correlations are performed, the correlation results for each set of n Code Samples 80 are summed in summers 84 to produce a series of values each separately indicating the correlation of n Signal Samples 75 with each of the sets of n Code Samples 80. These correlation results are applied to threshold test 82, the output of which is applied to SatProcessor 46 only when satellite signals 72 have been successfully received. The output of threshold test 82 specifies the number of delays which represent the prompt correlation for the reacquired satellite signal. It is important to note that in accordance with the present invention, the satellite tracking and reacquisition modes are not separated functions but rather interact seamlessly. That is, by providing a substantially expanded capture window, the correlations used for tracking are also automatically useful for immediate reacquisition as long the capture window is sufficiently wide to include any position error accumulated during signal obscuration or other loss.

Because the speed of reacquisition is very important in order to maximize the opportunity to utilize the brief time during travel through intersection 22 when satellite 19 may temporarily be in view, it is advantageous to perform all such correlations in parallel. Further, it is advantageous to continuously perform all such correlations in the capture window in order to minimize time when a satellite signal is not being tracked. In accordance with the presently preferred embodiment, exclusive OR correlators 74 are implemented in hardware rather than software to maximize the speed of correlation and minimize any error accumulation by minimizing the time for reacquisition.

In operation, when car 10 follows track 62 along roadway 12, during at least part of the time buildings 21 obscure the line of sight between car 10 and satellite 19. If satellite 19 had previously been acquired by GPS car system module 26, an approximate time value to synchronize with the satellite signals will be predicted. This value is maintained as accurately as possible within GPS car system module 26 while satellite 19 is obscured. In order to maintain the prediction for the required delay as accurately as possible, that is, to minimize the position error accumulated during signal loss, the above described techniques for maintaining or updating position accuracy by using cross-track hold, resetting position at a determined turn and/or the use of external sensors for dead reckoning provide a substantial benefit for use with the combined, expanded tracking and reacquisition windows described above.

Present technology makes it convenient to provide ½ chip delays between correlators, but other delay values may be used. Similarly, it is convenient to expect that the prompt correlation can be maintained within plus or minus 5 chips of the timing of the satellite signals. FIG. 3 therefore portrays a series of 9 or 10 early and 9 or 10 late correlators surrounding prompt correlator 74 to achieve the ±5 chip capture window surrounding prompt correlator 74 in 20 half chip steps. A different number of correlators and other delays would also work with the present invention.

Use of a plurality of fixed delays of one half chip width permit the immediate reacquisition of signals from a satellite to within an accuracy of one half chip width. In accordance with satellite signals 72 as presently provided by the NAVSTAR satellites, one half chip width represents about 150 meters of maximum position error. It is possible to substantially reduce the maximum position error, and/or the speed of processing the data, by using fixed delays of a different amount of delay, e.g. fixed delays of one third, one quarter, one fifth or some other value of a chip width.

Figure 4:
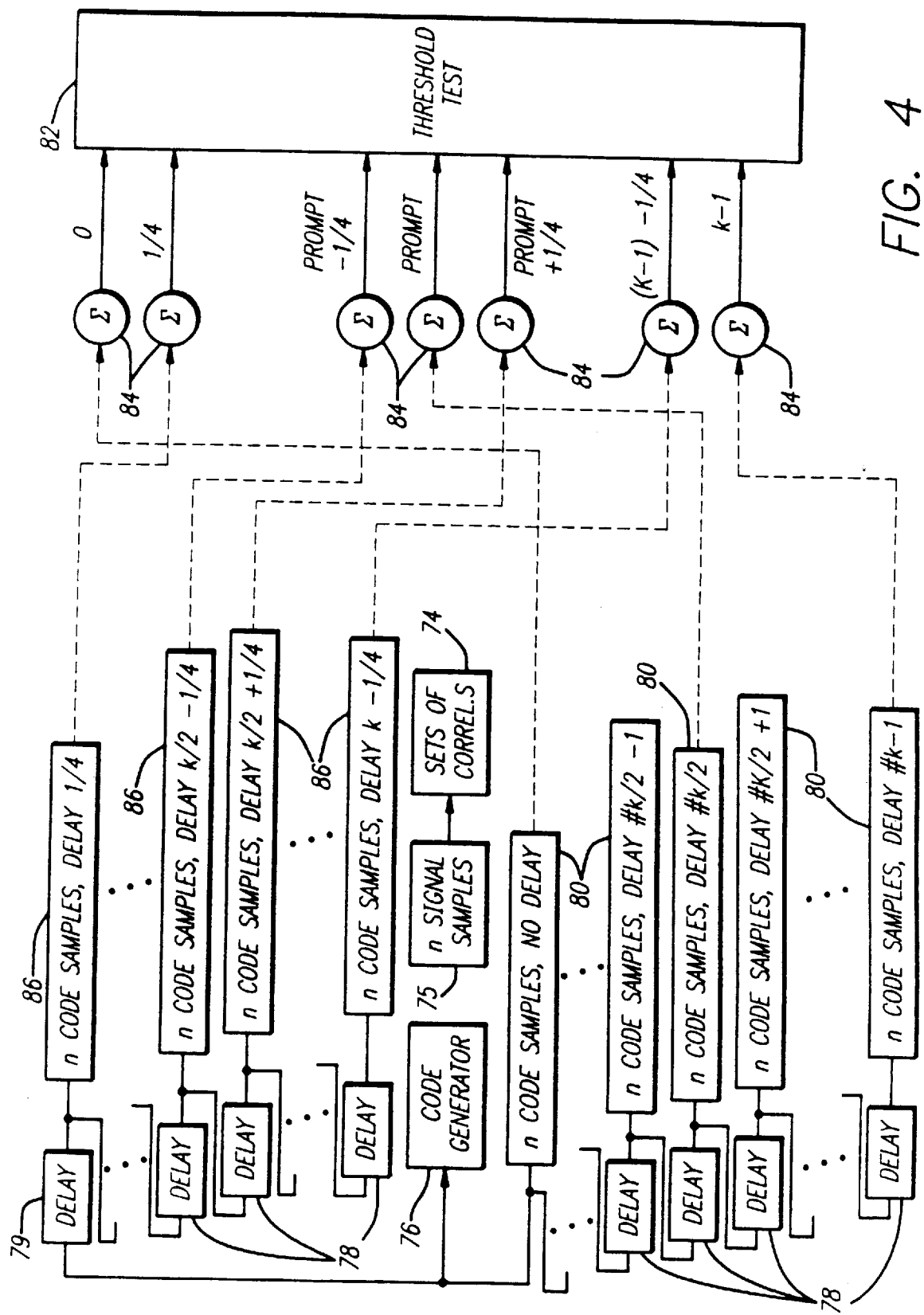
FIG. 4 is a schematic representation of a portion of the single satellite channel shown in FIG. 3 in which an additional plurality of sets of delayed code samples are correlated to provide a finer gradation of correlation intervals.

Conventional approaches for different modes of operation, switch between wide and narrow delays at acquisition +/or reacquisition in order to provide a compromise between the width of the capture window and the number of correlations required for the desired range. In accordance with the present invention, a new technique is used which permits the convenient use of fixed, chip width delays to provide a finer gradation of correlation steps. In particular, as shown in FIG. 4, two sets of half width delays are used to provide the equivalent of a set of quarter width delays. The number of sets of fixed delays and the offset between them may be selected in accordance with the requirements of the application being addressed.

Referring now to FIG. 4, a first plurality of sets of n Code Samples 80 are derived directly from code generator 76, delayed from each other by ½ chip width delays 78 and correlated with n Signal Samples 75 in exclusive OR (or NOR) correlators 74 as provided in FIG. 3. For convenience of explanation and drawing, the outputs from this first set of set of n Code Samples 80 are shown applied to summers 84 to indicate that the correlation products produced in exclusive OR correlators 74 from each such set of n Code Samples 80 are applied to threshold test 82 via summers 84. All such correlation products are applied, but for clarity only the correlation products having no delay, the predicted prompt or k/2th delay and the kth delay are depicted. The correlation products from this first plurality of sets of n Code Samples 80 are spaced apart by ½ chip width delay as noted above.

In addition, in accordance with the present invention, additional sets of correlation products at different spacings are available by use of one or more additional sets of ½ chip delays 78 by, for example, tracking the same satellite in two or more channels offset in time from each other. It is important to note again that other delays and/or offsets may also conveniently be used and the delays need not all be the same.

In particular, a second plurality of sets of n Code Samples 84 are derived from code generator 76 and delayed from each other by ½ chip width delays 78. However, the delays in the second sets of n Code Samples 84 are offset from the delays in the first sets of n Code Samples 80 by a fixed amount, such as a ¼ chip width delay, by insertion of ¼ chip width delay 79 between code generator 76 and the first set of n code samples in sets of n Code Samples 84. This results in each of the samples in sets of n Code Samples 84 falling halfway between two of the sets of n Code Samples 80. As shown in FIG. 4 only k–1 sets of n Code Samples 84 are required with k sets of n Code Samples 80.

Each of the sets of n Code Samples 84 are correlated with n Signal Samples 75 in exclusive OR correlators 74 as provided in FIG. 3 to produce correlation products which are then summed by additional summers 84. As noted above, the dashed lines between each of the sets of code samples and summers 84 are used to indicate that the correlation product between that set of code samples and n Signal Samples 75 is applied to a particular one of summers 84. As can then easily be understood from FIG. 4, correlation products separated from each other by ¼ chip width delays, from the 0th delay to kth delay, are produced using sets of ½ chip width delays and a single ¼ chip delay (which may represent the offset delay between two channels) and after individual summation are applied to threshold test 82 to determine which delay represents the currently prompt delay of satellite signals 72 from a satellite being reacquired by GPS car system module 26.

The second set of ½ chip delays may easily be implemented by having a second channel track the same satellite, offset, however by ¼ chip width delay 79.

In this way, the range of delay within which a satellite signal lock may be acquired, maintained and/or reacquired may be reduced from ±½ chip width, to about ±¼ chip width, which permits faster pull in to lock, i.e. when the tracking has been optimized and range error reduced to minimum.

It is important to note the seamless integration of tracking and reacquisition provided by the present invention in that the same correlations are used for tracking and reacquisition and the related speed of capture and lock and simplicity provided thereby. The ability to rapidly reacquire within a capture window so that one of the correlations may immediately be used as a prompt correlation, speeds up all data acquisitions thereafter. It is also convenient to utilize a first plurality of sets of n Code Samples 80 for tracking and, when satellite signals 72 are lost, provide additional accuracy in reacquisition by using a second plurality of sets of n Code Samples such as sets of n Code Samples 84. In particular, the same plurality of sets of n Code Samples 84 may be used for reacquisition of signals 72 for different satellites at different times in order to reduce the total number of components and steps required to produce all the necessary correlations and summations.

In operation, GPS car system module 26 continuously attempts to track and reacquire the signals from satellite 19 in SatTRAK channel 38 while satellite 19 is obscured from view. As car 10 passes through intersection 22, the line of sight to satellite 19 is momentarily not obscured by buildings 21. Whenever any of the correlations performed in SatTRAK channel 38 indicate that the satellite signals are being received with sufficient strength so that the correlation products from some of the correlators are above threshold, reacquisition is immediately accomplished. Reacquisition occurs when the correlator output indicating the largest magnitude is selected as the new prompt correlator. Conventional techniques for improving the quality of the data are then employed.

The data from satellite 19 is used to immediately, after a settling time for lock, update the GPS data and correct the currently known position information derived therefrom. Even if satellite 19 is then again immediately obscured, the update information derived during travel through the intersection by fast reacquisition provides a substantial improvement in accuracy of the GPS determined position. This will permit GPS car system module 26 to continue accurate navigation even through otherwise very difficult areas, such as city streets.

Although the use of single satellite navigation data by cross-track hold and the updating a satellite data by detecting turns and/or immediately reacquiring satellite signals in intersections have all been described separately, they are also very useful in combination. Terrestrial navigation systems, using GPS receivers in a stand alone mode, aided by map displays and data bases and/or aided by external sensors such as inertial navigation systems may benefit from the use of combinations of one or more such modes. In a preferred embodiment of the present invention, all three techniques are combined to maximize the ability of the car navigation system to provide accurate and useful navigation data while traversing a difficult environment such as city streets.

Figure 5:
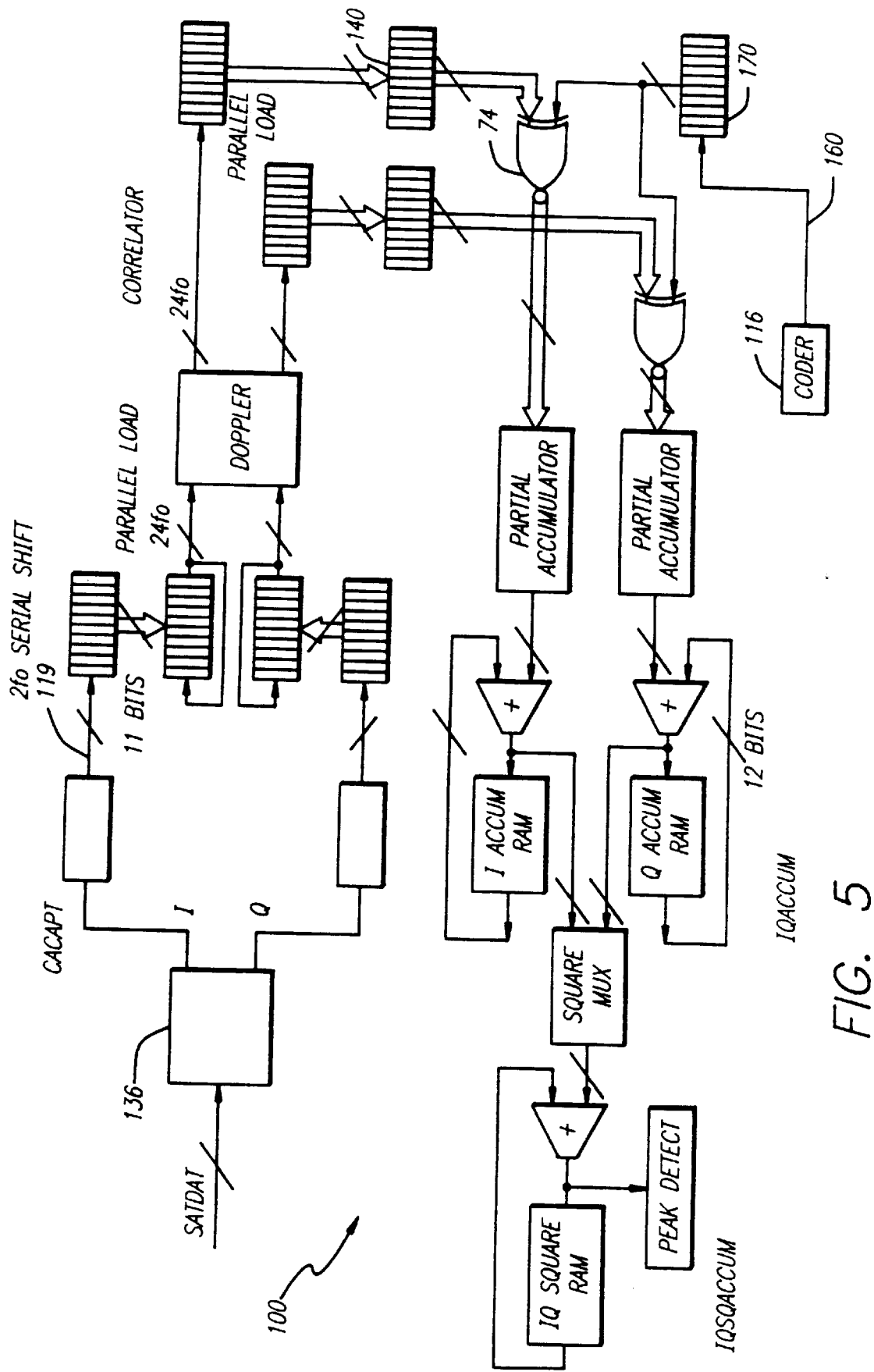
FIG. 5 is a functional block diagram of a preferred implementation, on an ASIC, of the satellite tracking channels and associated processing components of the GPS car navigation system shown in FIG. 1.

Referring now to FIG. 5, a preferred embodiment of the present invention is described in which major portions of SatTRAK channels 38, 40, 42 and 44 and SatProcessor 46 of the present invention are implemented in an Application Specific Integrated Circuit or ASIC 102. Many of the functions of a conventional satellite processor may still, however, be performed in software. The particular implementation depicted provides a 12 channel GPS acquisition and tracking system with fast reacquisition capabilities as described above while substantially reducing the number of gates required on the ASIC to implement this system.

The signals received by GPS antenna 28 are digitized and form a digital composite of signals received from all satellites in view to produce sample data 100 which is at a frequency of 37.33 $f_0$ where $f_0$ is the chip rate of the C/A code applied to each GPS satellite. For convenience, the frequencies described below will be designated in terms of multiples of $f_0$. Each of 12 Space Vehicles (SVs) or satellites are tracked in ASIC 102 under the control of Central Processing Unit, or CPU, 101 which provides control signals and data to ASIC 102. In particular, CPU 101 provides data regarding the predicted Doppler shifts and C/A code applied to each SV to Random Access Memory, or RAM, R1 103 associated with ASIC 102 which provides the data to RAM R2 105 at designated times. RAM R2 105 provides data to and receives data from ASIC 102, permitting CPU 101 data updating and ASIC 102 processing of old data to operate simultaneously. RAM R2 105 is used by ASIC 102 primarily to store intermediate values of signals during processing. Other conventional portions of a micro-computer including a CPU are not shown but conveniently may include devices operating software implementing the single satellite, cross-track hold and other techniques described above as well as other functions of SatProcessor 46.

Sample data 100 is applied to C/A code acquisition, tracking and reacquisition block CACAPT 104 in ASIC 102 where it is split into in-phase and quadrature-phase, or I and Q, signals at baseband by I/Q splitter 106. After processing by CACAPT 104, the I,Q signals are rotated for Doppler shift in 12 channel Doppler Block 108 which separately compensates for the expected Doppler frequency shifts of each of the 12 SV's which can be tracked.

The Doppler rotated I,Q signals for each SV are then applied to Correlator Block 110 where each signal sample, which is from one of the 12 SVs, is correlated in a multiplexed fashion with 20 delayed versions of the C/A code, produced by 12 channel Coder Block 112, for that SV. During each segment of time, as described below with regard to FIG. 11 in greater detail, Correlator Block 110 performs 240 C/A code correlations in accumulator 175 to enhance the speed of acquisition and reacquisition. The output of Correlator Block 110 is applied to IQACCUM Block 114, and the output of IQACCUM Block 114 is applied to IQSQACCUM 116, in Accumulator Block 115. IQACCUM Block 114 is conveniently configured from another block of RAM associated with ASIC 102, identified herein as RAM 3. Similarly, IQSQACCUM 116 is conveniently configured from another block of RAM associated with ASIC 102, identified herein as RAM 4.

Accumulator Block 115 operates in different fashions during acquisition, tracking and reacquisition modes under the direction of CPU 101. During acquisition mode, Coder Block 112 is caused to sequence through as many sets of 240 different codes delays as necessary to acquire the satellite signals from a particular space vehicle. That is, as many sets of 240 different delays are correlated in Correlator Block 110 to provide IQSQACCUM 116 with an appropriate correlation output whose power indicates that correlation has been achieved with that satellite. The process is then repeated for each satellite to be acquired. For convenience, all delays may be tested.

During reacquisition, a single set of 20 delays are correlated in Correlator Block 110 to determine if one such delay provides a peak value above a predetermined threshold to indicate that a correlation has been achieved and the satellite thereby reacquired. The reacquisition mode operates transparently within the tracking mode in that a set of 20 delays are correlated in Correlator Block 110. If tracking is maintained, the peak signal may migrate from a particular delay to the next adjacent delay but will be maintained within the current set of 20 delays being correlated. It is convenient to consider the delay producing the signal with the greatest magnitude as the prompt correlation product. The signals produced by one more and one less delay then become the early and late correlation products which may be processed in a conventional manner to maintain lock with each satellite.

If the signal from the satellite is temporarily obscured or lost for any other reason, the then current set of 20 delays is correlated to search for a peak of sufficient magnitude to indicate reacquisition. The doppler and code values are continuously updated based upon the last available position information including velocity, and the correlations are performed, until the satellite signal is reacquired or sufficient time has elapsed so that the satellite signal is considered lost.

The operation and configuration of ASIC 102 will now be described in greater detail with regard to the in-phase or I signal path. The quadrature phase or Q signal path is identical and need not be separately described.

Within CACAPT 104, sample data 100 is applied at $37.33f_0$ to I/Q splitter 106 to produce a 2 bit signal at $18.67f_0$ which is further reduced to $2f_0$ by Digital Filter 118 which operates by adding sets of 10, 9 and 9 samples which are summed, quantized, and then stored serially in 11 sample deep buffer 120. When 11 sample deep buffer 120 is filled, the data is transferred in a parallel fashion to an identical buffer, called parallel block 122, for Doppler rotation. Data is therefore transferred out of 11 sample deep buffer 120 when 11 samples are received, that is, at a chip rate of 1/11th of $2f_0$ or approximately $0.18f_0$. 11 sample deep buffer 120 operates as a serial to parallel converter while parallel block 122 operates as a parallel to serial converter. This results in 186 parallel transfers per msec.

Data is shifted out of parallel block 122 at $24f_0$ to 12 channel Doppler Block 108 so that the Least Significant Bit or LSB of the serial converter, parallel block 122, is the output of CACAPT 104 in the form of CapIOut and CapQOut which are applied as CACAPT Data output 123 to 12 channel Doppler Block 108. The increase in chip rate from $2f_0$ to $24f_0$ provides an operating speed magnification of 12 as will be described below in greater detail.

Figure 6:
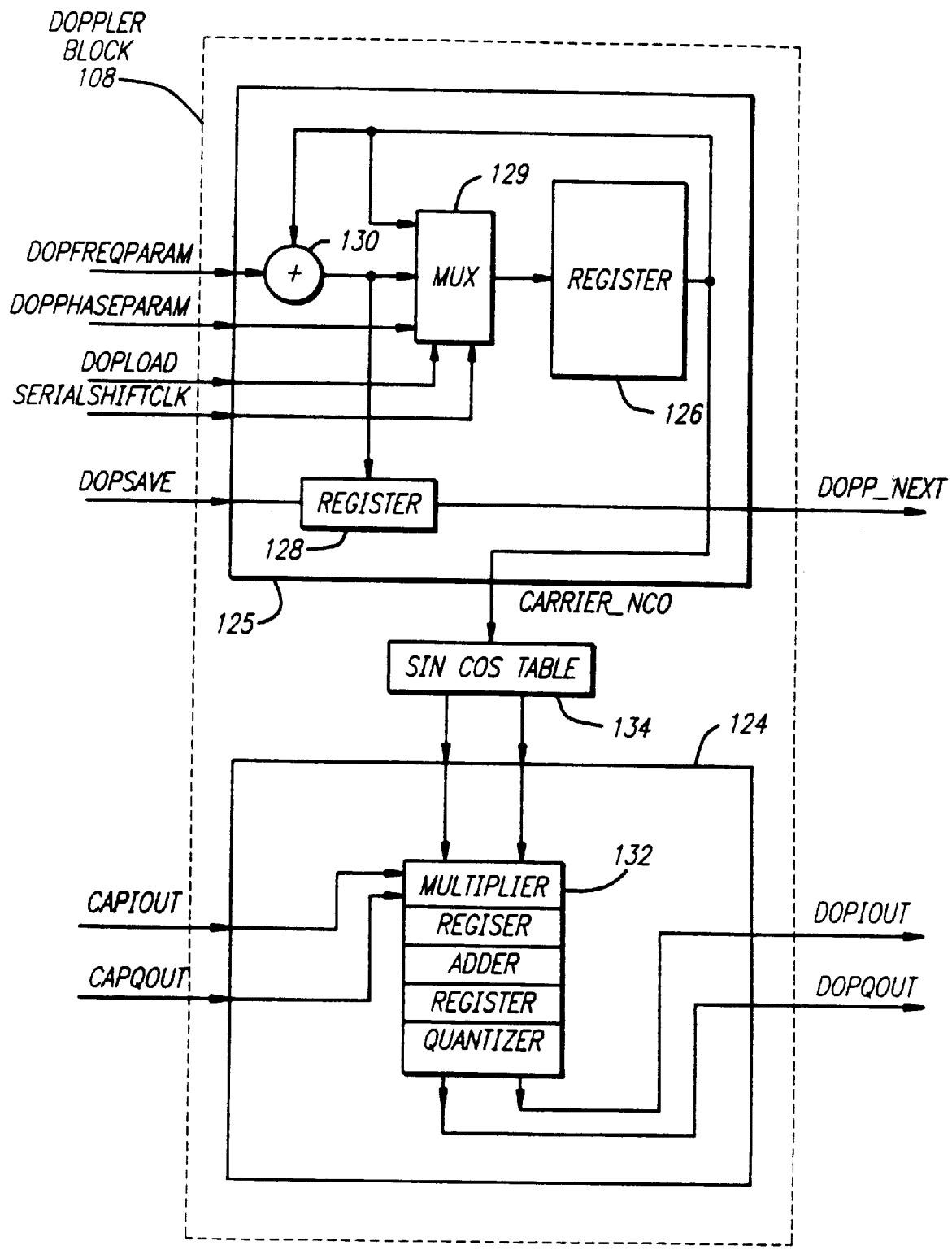
FIG. 6 is a functional block diagram of the Doppler Block of the GPS car navigation system shown in FIG. 1.

Referring now also to FIG. 6, 12 channel Doppler Block 108 is now described in greater detail. Doppler Block 108 receives satellite specific CACAPT Data output 123 including CapIOut and CapQOut from CACAPT 104 for storage in Doppler Register 124. Satellite or source specific predicted Doppler phase, after processing by Carrier Numerical Control Oscillator or NCO 125 and sine/cosine look-up table 134, is also applied to Doppler Register 124 where it is added to CapIOut and CapQOut for the same SV (or other source) to form dopIOut and dopQOut. Within Doppler Block 108, Carrier_NCO 125 operates at an effective rate of $2f_0$ for each satellite channel because the data sample rate is $2f_0$.

Figure 9:
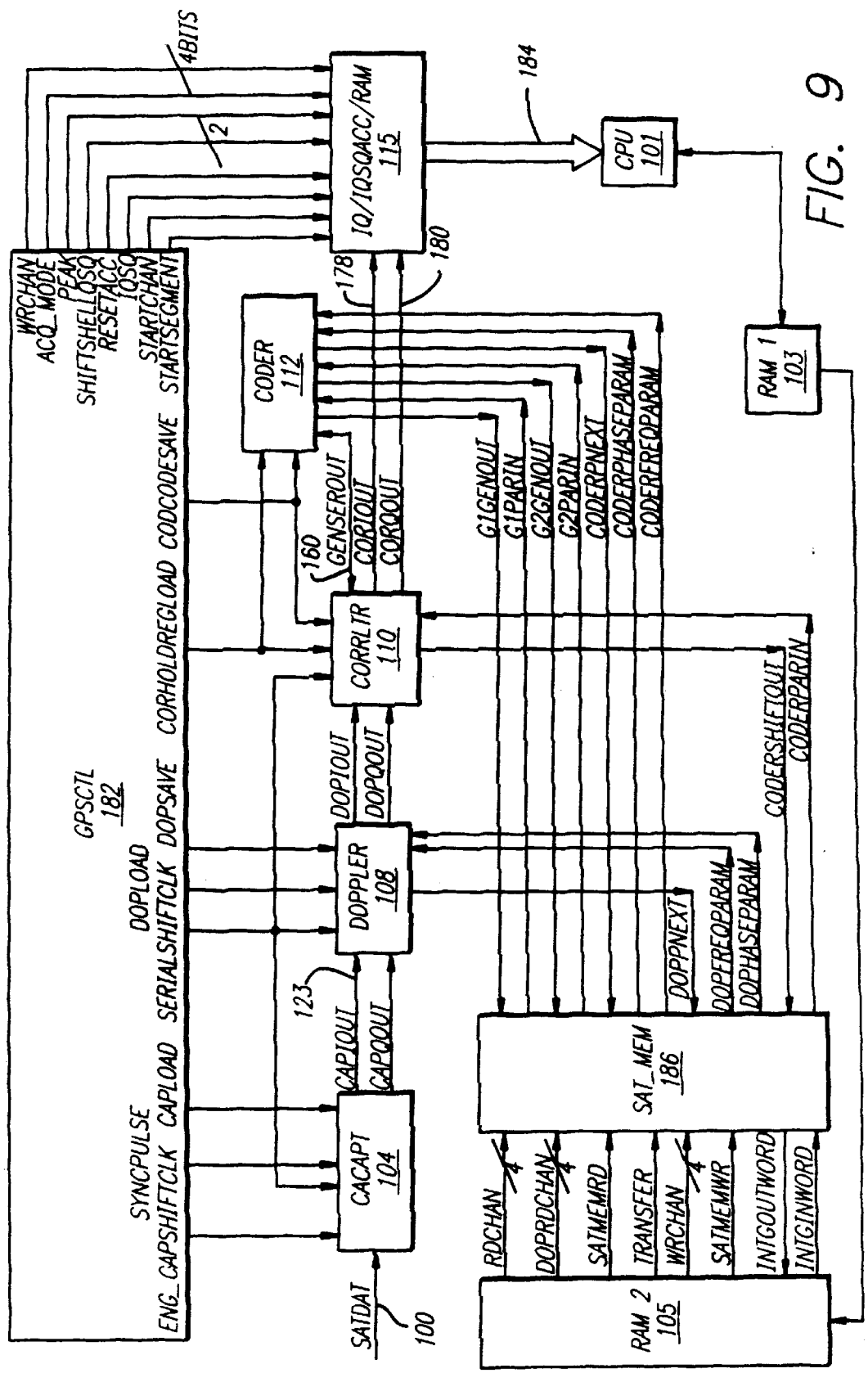
FIG. 9 is a function block diagram overview showing the interconnections between the Doppler, Code, Correlator and other blocks of the system described in FIG. 5.

For each SV, CPU 101 stores the satellite specific predicted carrier phase dopPhaseParam, and predicted carrier frequency dopFreqParam, in RAM R2 105. Sat_Mem 186 then transfers the dopPhaseParam and dopFreqParam as shown in FIG. 9 to Carrier Phase Register 126 and Carrier Phase Output Buffer 128, respectively, at each 1 msec boundary. In the drawings, the number of the first and last bit of the signal is provided in parenthesis, separated by a full colon, in accordance with current conventions. Therefore, dopFreqParam is a 24 bit digital value, the MSB of which is bit number 23 and the LSB of which is bit number 0. Adder 130 adds carrier phase to carrier frequency, derived from dopPhaseParam and dopFreqParam, to produce the current carrier phase value in Carrier Phase Register 126 shown as Carrier_NCO.

Figure 11:
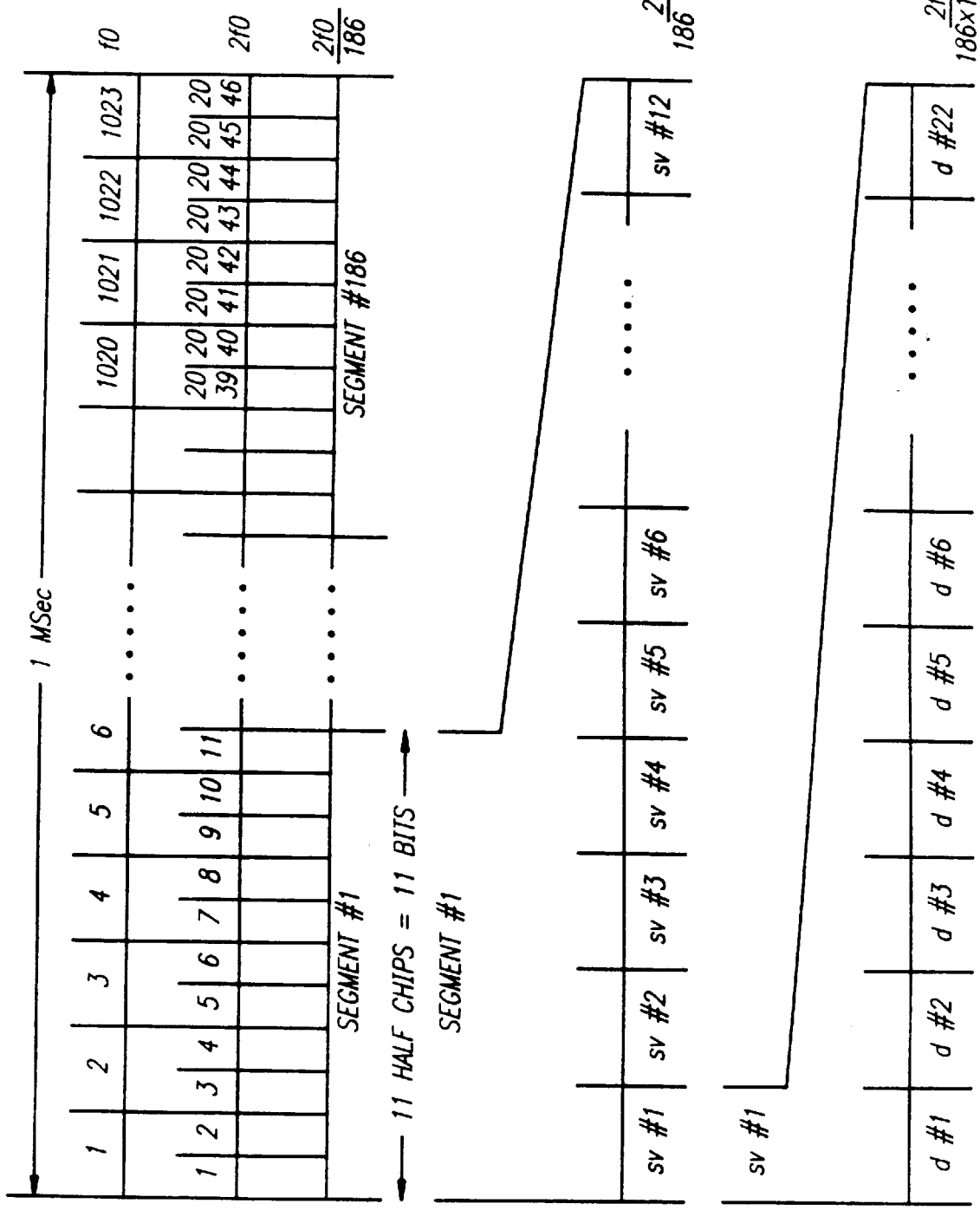
FIG. 11 is a series of exploded time segments illustrating the operation of the data path of the present invention.

The four Most Significant Bits or MSB's of Carrier_NCO in Carrier Phase Register 126 are applied to sine/cosine look-up table 134 which includes 2 4-bit registers for storing its output. The output of sine/cosine look-up table 134 is applied to Doppler Multiplier 132 in Doppler Register 124 for Doppler rotation of CACAPT Data output 123 (CapIOut and CapQOut) to produce rotated SV output signals dopIOut and dopQOut. Doppler Register 124 uses Doppler Multiplier 132, as well as four 4-bit registers, two adders, another pair of 5-bit registers and a quantizer to form dopIOut and dopQOut. Referring for a moment to FIG. 11, dopIOut and dopQOut are applied to parallel converter 166 and rotated SV output signal 127 is the output of serial to parallel converter 166 which is applied directly to 11 bit Holding Register 140.

During each segment of time, the beginning value for the Doppler phase of each SV is stored in RAM R2 105, retrieved therefrom by Doppler Block 108 for the rotation of the SV during that segment. At the end of each segment, the end value of Doppler phase is stored in RAM R2 105 for use as the beginning value for the next segment. Under the control of gpsctl 182, Doppler phase value dopP_Next in Carrier Phase Output Buffer 128, saved at the end of each rotation for a particular SV by dopSave, is applied to Sat_Mem 186 for storage in RAM R2 105 for that SV, to be retrieved by Doppler Block 108 again during the next Doppler rotation of that SV in the following segment. The operation of Multiplexer Block 129 may be best understood from the description of the triple multiplexing of ASIC 102 associated with FIGS. 10 and 11.

Figure 7:
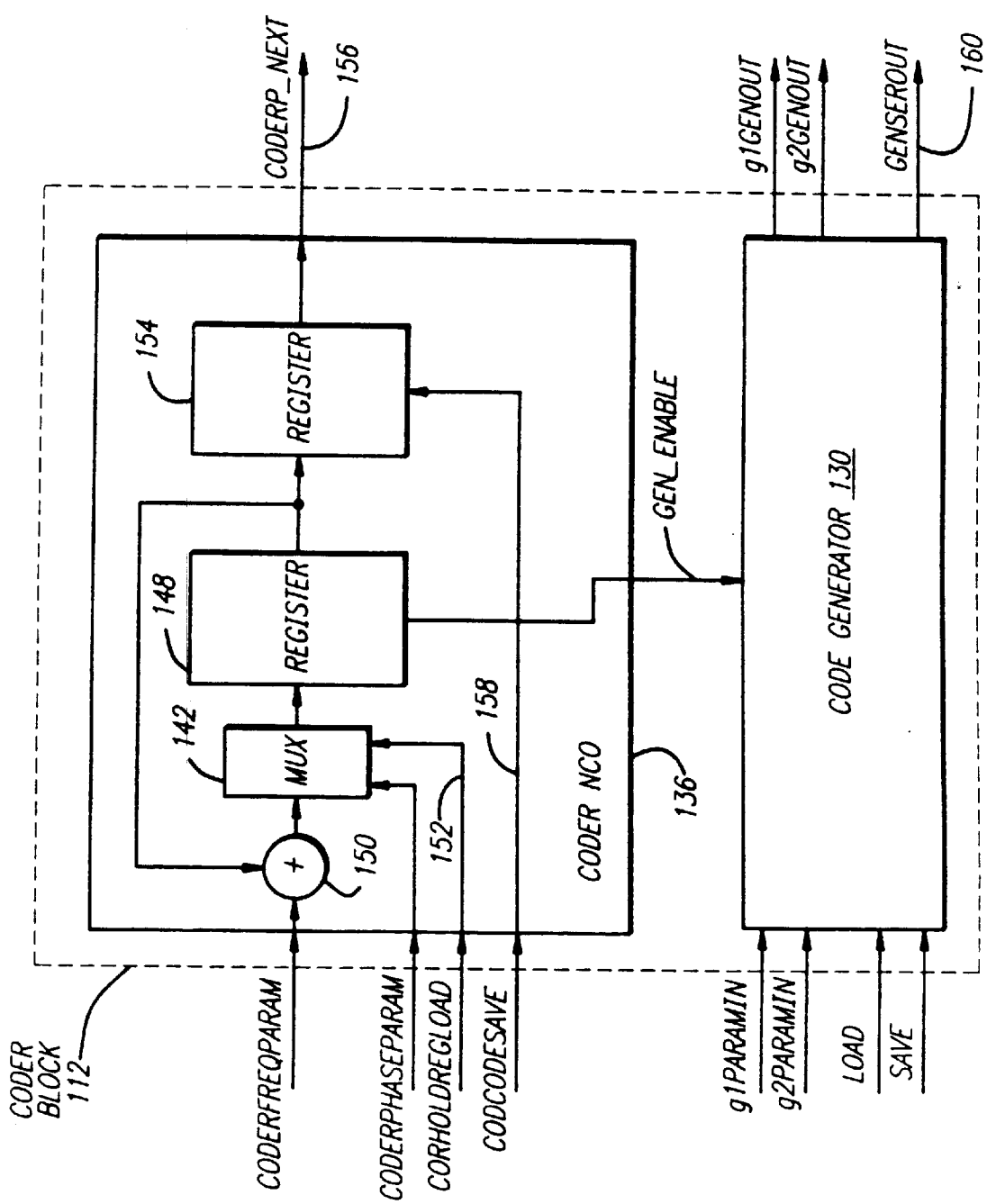
FIG. 7 is a functional block diagram of the Coder Block of the GPS car navigation system shown in FIG. 1.

Referring now also to FIG. 7, 12 channel Coder Block 112 includes Coder_NCO 136 and Code Generator 138. Coder_NCO 136, which is similar to Carrier_NCO 125 shown in FIG. 6, creates Gen_Enable whenever Phase Accumulator 148 overflows. Gen_Enable is the MSB of the output of Phase Accumulator 148 and is applied to Code Generator 138.

In particular, under the control of gpsCtl 182, Sat_Mem 186 applies the satellite specific 24 bit code frequency parameter, coderFreqParam, and the 24 bit satellite specific code phase parameter, codePhaseParam, at each 1 msec edge to Coder_NCO 136 from RAM R2 105. CoderFreqParam is added to codePhaseParam effectively at $4f_0$ per channel in Phase Adder 150 even though codePhaseParam operates at $48f_0$ during tracking and reacquisition. A pulse can be generated for Gen_Enable between 0 Hz and $4f_0$ Hz. In order to generate Gen_Enable at $2f_0$, the value of half the bits (23:0) of Phase Accumulator 148 must be loaded in as coderFreqParam.

The LSB of codePhaseParam represents 1/256th of a C/A code chip. CodePhaseParam initializes the contents of Phase Accumulator 148. Gen_Enable is generated whenever Phase Accumulator 148 overflows. Phase Accumulator 148 is a 25 bit register initialized by the value of codePhaseParam when corHoldRegLoad 152 from CPU 101 is active at each 1 msec edge when new data is written from CPU 101. The 24 LSB's of 25-bit Phase Accumulator 148 are then added to coderFreqParam in Phase Adder 150 and returned to Phase Accumulator 148. Phase Buffer Register 154 stores and buffers the contents of Phase Accumulator 148, to produce CoderPNext which is updated whenever codCodeSAve 158 from gpsctl 182 is active. CoderPNext is applied to Sat_Mem 186 for storage in RAM R2 105. The operation of multiplexer 142 may be best understood from the description below of the triple multiplexing of ASIC 102 provided with FIGS. 10 and 11.

Gen_Enable is applied to Code Generator 138 to cause a new code to be generated. C/A Codes parameters G1 and G2 are parallel loaded from RAM R2 105 by Sat_Mem 186 as g1ParIn and g2ParIn into Code Generator 138 to produce g1GenOut and g2GenOut which are returned to RAM R2 105 by Sat_Mem 186. The bit-0 of both G1 and G2 generators in Code Generator 138 are internally XORed and generate genSerOut 160 which is serially applied to 11 bit Code Shift Register 170 in Correlator Block 110, as shown in FIG. 5. Code Generator 138 generates the following C/A codes:

$$G1=1+X3+X10$$

$$G2=1+X2+X3+X6+X8+X9+X10.$$

The output of Code Shift Register 170 is applied to correlators 74, 11 bits at a time at $48f_0$ so that at least 20 code delays, separated by one half chip width, are correlated against each Doppler rotated sample from each SV. The increase in chip rate from $2f_0$ to $48f_0$ provides a magnification factor of 24 as will be described below in greater detail.

Values of G1 and G2 are be stored in RAM R2 105 during each segment after correlation with the doppler rotated sample in correlators 74 for that SV so that they may then be retrieved by Coder Block 112 during the next time segment for correlation of the next 11 bit sample from the same SV.

Figure 8:
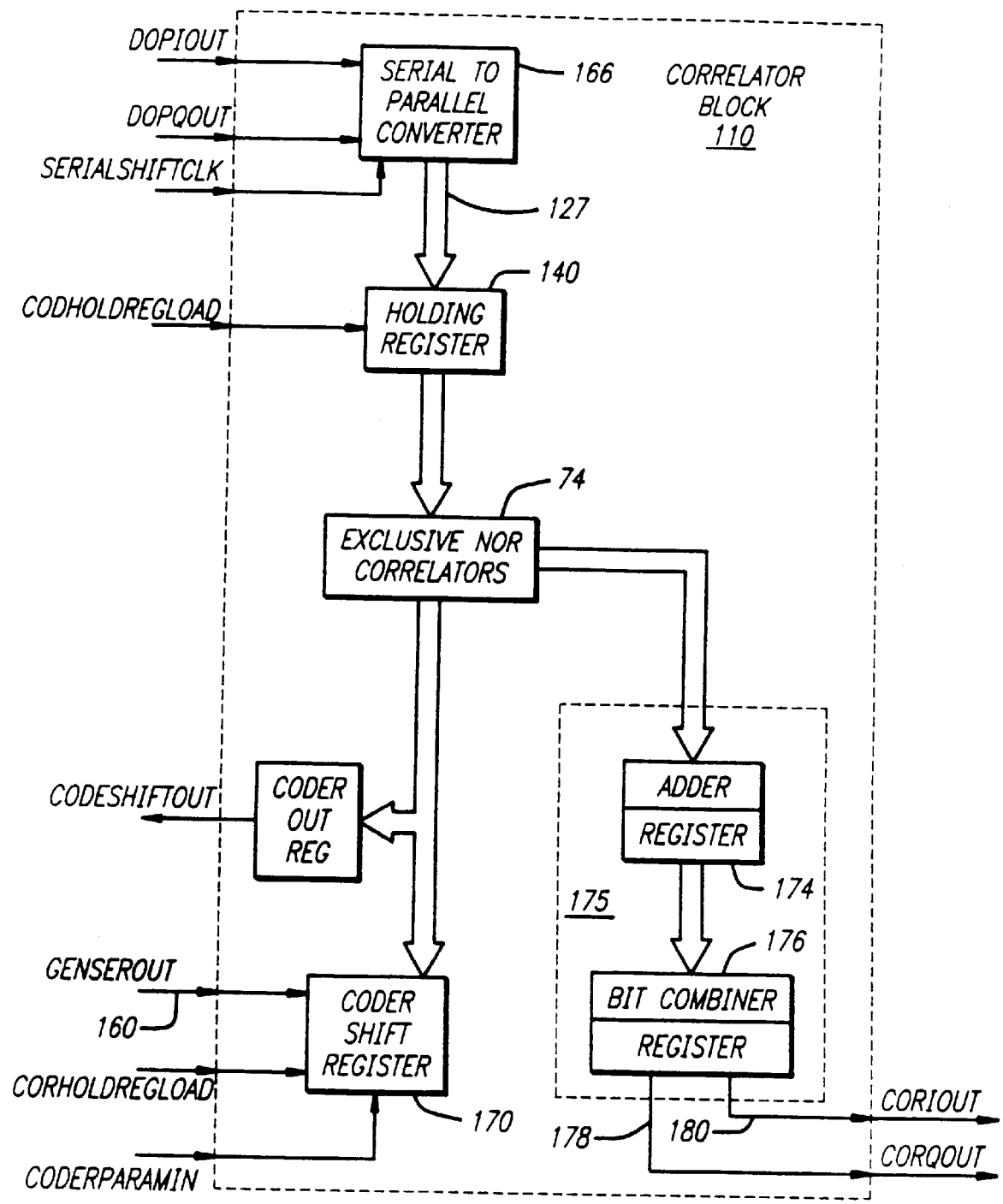
FIG. 8 is a functional block diagram of the Correlator Block of the GPS car navigation system shown in FIG. 1.

Referring now also to FIG. 8, Correlator Block 110 is shown in greater detail. DopIOut and dopQOut in the rotated SV output from Doppler Block 108 are applied to serial to parallel converter 166 which is then parallel loaded to Holding Register 140. GenSerOut 160 from Coder Block 112 is applied to Code Shift Register 170 in Correlator Block 110. These data sets represent the doppler shifted data received from the SV, as well as the locally generated code for that SV, and are applied to Exclusive NOR gate correlator 74 for correlation under control of gpsCtl 182.

The output of correlator 74 is applied to Adder 174 and combined in Bit Combiner 176 to corIOut 178 and corQOut 180 which are applied to IQACCUM Block 114 and IQSQACCUM 116 shown in FIG. 5. Adder 174 and Bit Combiner 176 operate as a partial accumulator as indicated by accumulator 175 in FIG. 5.

Referring now also to FIG. 9, on overview of the operation of ASIC 102 is shown. A dedicated set of on-chip logic controls the operation of ASIC 102 and is identified herein as gpsctl 182. In particular, under the control of gpsCtl 182, sample data 100 from the GPS satellites is applied to CACAPT 104 where it is separated and decimated into I and Q data streams to form CACAPT Data output 123. SV data 123 is rotated for the predicted Doppler shift of each SV to produce rotated SV output signals dopIOut and dopQOut which are correlated with genSerOut 160 from Coder Block 112 in correlators 74. CorIOut 178 and corQOut 180 from correlators 74 are accumulated in IQACCUM Block 114 and IQSQACCUM 116 to produce output 184 to CPU 101.

As will be further described below in greater detail, a portion of memory is used for Sat_Mem 186 which stores and provides the doppler shift and code information required during multiplexing.

In operation, every millisecond is divided into 186 segments, each of which includes 264 clocks. Within these 264 clocks, 12 channels are processed with each channel taking 22 clocks to compute 22 different correlations or delays. Only 20 of these 22 correlations are stored and used for subsequent processing. For each channel, gpsCtl 182 controls the loading of Carrier_NCO 125 in Doppler Block 108 using dopLoad and dopSave. Similarly, gpsctl 182 controls the loading of Coder_NCO 136 in Coder Block 112 via corHoldRegLoad and corCodeSave. The flow of data through Correlator Block 110 is controlled with serialShiftClk, and also corHoldRegLoad and codCodeSave. Control signals are applied to IQACCUM Block 114 and IQSQACCUM 116 for each channel and include startSegment, startChan, resetAcc, peak, iqsq, wrchan, ShiftSelIqSq and acq_mode. Within each segment, gpsCtl 182 provides the periodic signals eng_capShiftClk, capLoad, syncpulse, serialShiftClk to CACAPT 104 to repackage incoming satellite data samples into groups of 11 half chip samples.

All accesses initiated by gpsCtl 182 are processed by Sat_Mem 186 to generate read/write control and address signals for RAM R1 103 and RAM R2 105. GpsCtl 182 controls the flow of data through all data paths together with Sat_Mem 186 and manages the access of channel parameters stored in RAM R1 103 and RAM R2 105. RAM R1 103 is written to by the user to define the channel parameters that will be loaded to RAM R2 105 at the end of the corresponding integration or accumulation time. RAM R2 105 is used by the datapath as a scratchpad to store the intermediate values of the various channel parameters during processing.

Data read out of RAM R2 105 is sent to the various parameter registers in Doppler Block 108, Coder Block 112, Correlator Block 110 and gpsctl 182 under the control of Sat_Mem 186. Data from these blocks and RAM1 190 are multiplexed at the input to the write port of RAM R2 105. RAM R1 103 is a 16×108 asynchronous dual port ram used for the parameters for all 12 channels while RAM2 192 is another 16×108 asynchronous dual port ram used for storing intermediate values of the satellite parameters during processing, while switching from one channel to the next.

Figure 10:
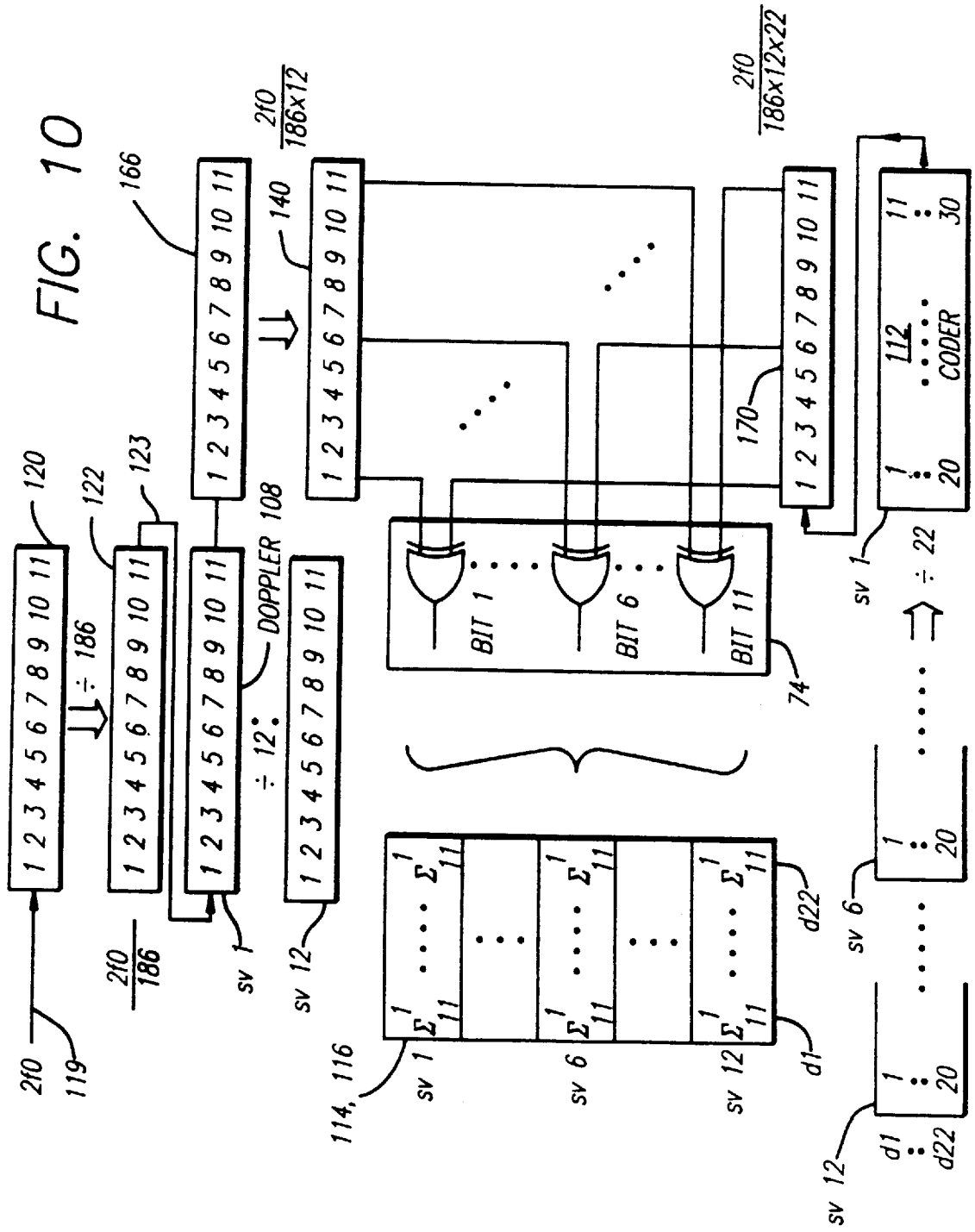
FIG. 10 is a block diagram of the operation of the system, shown in FIGS. 5 and 9, illustrating the data path of the present invention.

Referring now to FIG. 10, the system of the present invention includes a multiplexed data path in order to reduce the size and complexity of ASIC 102 on which the majority of the parts of the system can be provided. Conventional receiver designs have multiplexed a single set of correlators for use for each of the separate channels in which an SV is tracked in order to reduce the number of correlators required. The use of the system of the present invention reduces the million or more gates that would be required for a conventional configuration down to a manageable number, on the order of about less than 100,000.

In accordance with the present invention, in addition to multiplexing the satellite channels in a manner in which no data is lost, the code delay correlations are also multiplexed. That is, conventional receivers use two or three correlators to provide early, late and/or prompt correlations for each SV. The present invention multiplexes a plurality of code delays in order to provide far more code delay correlations than have been available in conventional systems without substantially multiplying the hardware, or chip area on ASIC 102 required by the number of gates used.

The multiplexing of code delays permits the wide capture window described above with regard to FIGS. 3 and 4 that permits rapid SV reacquisition. In particular, 20 delays such as ½ chip delays are provided and constantly monitored for each SV so that GPS data can be acquired even during brief glimpses of the SV, for example, when car 10 is in intersection 22 as shown in FIG. 1. The SV can be reacquired and useful data obtained because the modelling of the vehicle's position on roadway 12 is sufficiently accurate to keep the predicted code and doppler values for a previous acquired and currently obscured SV within a window of ±10 half chip code delays. In this way, data obtained during reacquisition can be used directly as GPS data. That is, the reacquisition mode is transparent to the tracking mode. The GPS data is acquired whenever available without substantial lost time for reacquisition.

Further, the operation of satellite tracking is itself multiplexed for each set of data for all 12 channels in order to further substantially reduce the ASIC gate count. That is, only a small portion of the bits in the C/A code is processed at one time for all 12 SV's. In order to digitally process the signals received, the digital representations of these signals must be processed in registers and buffers capable of storing the digital data. The C/A code contains 1023 bits in each repetition which lasts 1 msec. If all 1023 bits were to be processed at once, registers 1023 bits wide would be required. Such registers would be expensive in cost and gate count and quite cumbersome. In accordance with the third level of multiplexing used in the triply multiplexed receiver configuration of the present invention, a smaller register is multiplexed to handle different portions of the 1023 bits of the C/A code. This means the smaller register is used many times during each 1 msec repetition of the C/A code to process enough smaller samples of the data received so that within each msec all 1023 bits can be processed.

In the preferred embodiment described above particularly in FIGS. 3 to 9, a configuration using 11 bits registers was used so that each register is used 186 times per msec to process all 1023 bits of a C/A code repetition. Each ¹⁄₁₈₆th of a msec is called a segment. The tracking of each SV is therefore multiplexed 186 times by processing the 11 bits in each register during each segment. In addition, in the preferred embodiment, 12 channels are used to track a maximum of 12 SV's. This requires that each 11 bit segment is multiplexed 12 times during that segment to apply a doppler rotation for each SV.

Further, each channel is further multiplexed by a factor of 22 to provide a substantial plurality of different code delays. This requires that the doppler rotated sample for each SV is correlated 22 times with different C/A Code delays before the doppler rotated sample for the next channel is produced. In this manner, 22 different code phases may be tested for each of 12 SV during each of 186 segments to provide real time data with only 11 bit wide registers by processing each register 186 times per msec.

It is important to note that the processing of the present invention occurs during a particular segment, i.e. a ¹⁄₁₈₆th of a repetition of the C/A code, during the length of time required for the segment to be collected. In this optimized manner, no data is lost during tracking or reacquisition or switching between these states because the data being processed in any particular segment is at most 11 half chips delays old.

Referring now to FIGS. 10 and 11, the output of Digital Filter 118 shown in FIG. 5 is sample data stream 119 at $2f_0$. The chip rate of the C/A modulation of the signals 100 from the SVs is at $f_0$. In order to avoid loss of any data, the SV signals must be sampled at least at their Nyquist rate, that is, at twice the chip rate of the modulation of interest which is $2f_0$. Although sample data stream 119 can be operated at a higher chip rate than the Nyquist rate, which is twice the chip rate, there is no advantage in doing so.

Sample data stream 119 is therefore a series of samples of the digitized and filtered SV data at twice the chip rate of the C/A code, that is, each sample in sample data stream 119 has a width equal to one half of a C/A code chip. The number of bits in each msec or cycle of code in sample data stream 119 is twice the number of bits in the modulation, i.e. 2046 bits each representing one half of a C/A code chip. In accordance with the multiplexing scheme of the preferred embodiment being disclosed, the data is processed in 11 bit segments, and sample data stream 119 is therefore applied serially to 11 bit (10:0) register value buffer 120. The time required to serially store 11 bits out of a total of 2046 bits in the $2f_0$ data stream is 1÷(2046÷11=186) or ¹⁄₁₈₆th of a msec.

During the time the first set of 11 sample bits are being stored in 11 sample deep buffer 120, no bits are available for processing. After the first 11 sample bits are serially received and serially stored, the 11 sample bits are transferred in parallel to parallel block 122. This parallel operation therefore occurs every ¹⁄₁₈₆th of a msec or at a rate of approximately $0.18f_0$. Each ¹⁄₁₈₆th of a msec is called a time segment or segment and is the unit of processing for most of the operations. The 1023 chip C/A code of each of the satellites in the composite signal received is processed in 11 half chip bits. Dividing the msec repetition rate of the C/A code into 186 time segments multiplexes each of the 11 bit registers by a multiplexing factor of 186.

CACAPT Data output 123 from parallel block 122 is processed in Doppler Block 108 at a much faster chip rate, for example at $24f_0$. That is, the 11 bits of sample data in each segment of time is multiplexed by a factor of 12 to permit 12 different operations to be performed to that set of 11 bits of data. In particular, in Doppler Block 108, CapIOut and CapQOut of CACAPT Data output 123 are multiplied in Doppler Register 124 by twelve different doppler shifts so that within each segment twelve different doppler rotations are performed.

Each different doppler shift represents the predicted doppler rotation required for each of the maximum of 12 different Svs that can be tracked. The increase in processing chip rate from $2f_0$ to $24f_0$ multiplexes the processing for each of 12 channels of data. It is important to note that the multiplexing to permit one channel to operate as 12 multiplexed or virtual channels each representing a different SV is applied only after the input signals are multiplexed, that is, broken into 186 time segments each including 11 half chip width bits. In this way, the multiplexing for 12 channels or satellites is easily accomplished with relatively inexpensive 11 bit registers without loss of time or data. The selection of the number of sampling to be an integer division of the number of code bits per period is important to achieve these goals. Multiplexer Block 129 in Carrier_NCO 125 controls the timing of this multiplexing under the direction of gpsctl 182.

The output of Doppler Block 108, signals dopIOut and dopQOut, are applied to serial to parallel converter 166 within Correlator Block 110. Each rotated SV output signal 127 represents the rotated signal from a single SV and 12 such rotated SV output signals 127 are produced in each segment of time.

Rotated SV output signal 127 is loaded in parallel fashion into Holding Register 140 in Correlator Block 110. The input to Exclusive NOR gate correlator 74 is therefore an 11 bit wide signal which is retained for $\frac{1}{12}$th of a time segment as one input to Exclusive NOR gate correlator 74.

Correlator 74 is a series of 11 separate one bit correlators which all operate in parallel. One input is rotated SV output signal 127 while the other 11 bit input is provided by 11 one bit genSerOut 160 output bits from Coder Block 112. During the $\frac{1}{12}$ of a time segment provided for operation on the rotated SV output signal 127 for a particular satellite, the code for that SV is produced serially by Code Generator 138 and applied to Code Shift Register 170.

At the beginning of the correlation for a particular channel, 11 bits of the code for that SV have been shifted into Code Shift Register 170 and are available therein for correlation. Every $\frac{1}{22}$nd of a channel (that is, a $\frac{1}{12}$ of a segment) each of the 11 bits in Code Shift Register 170 are correlated in one of 11 one bit exclusive Nor gates in Exclusive NOR gate correlator 74. This produces 11 correlator output bits, the sum of which indicates the magnitude of the correlation between the rotated SV output signal 127 and that code phase. These 11 correlation sums produced in parallel are summed in parallel and stored in the first of 22 summers related to that SV in Accumulator Block 115.

During the next or second $\frac{1}{22}$nd of a channel, Code Generator 138 produces the next bit for the C/A code for that SV. This next bit is applied serially to Code Shift Register 170. At this time, 10 bits from the first correlation remain in Code Shift Register 170 and together with the newest bit form another 11 bit sample of the expected code for that SV, delayed from the previous 11 bit sample by the time required to generate 1 bit, that is, one half chip width at the rate code is produced, $48f_0$. The second sample is therefore a one half chip delayed version of the code, delayed one half chip width from the previous 11 bit samples. It is important to note that the two 11 bit code samples just described differ only in that a new bit was shifted in at one end of the register to shift out the MSB at the other end of the register.

The 11 bit correlation product of the same rotated SV output signal 127 and the second 11 bit sample of code is then stored in the second of the 22 summers related to that SV in Accumulator Block 115. Thereafter, the remaining 20 serial shifts of the genSerOut 160 from Code Generator 138 are correlated against the same rotated SV output signal 127 to produce 20 more sums of 11 bit correlations for storage in Accumulator Block 115 for that SV. The result is that 22 values are then available within Accumulator Block 115 for processing, each value is a measure of the correlation of the signals from one SV with 22 different code phases or delays, each separated by one half chip width.

During the next $\frac{1}{12}$ of a time segment, that is, during the processing of the second multiplexed channel, the rotated SV output signal 127 for the next SV, is applied to Holding Register 140 for correlation with 22 different one half chip delays of the code generated for that satellite. At the end of a segment, Accumulator Block 115 includes a matrix of 12 by 20 different sums. In one implementation of the present invention, it has been found to be convenient to save only 20 out of the 22 possible code delay correlation results. The 12 rows of 20 sums represents the measure of correlation for each of the 12 SV's at 20 code phases or delays.

In summary, the data path for the present invention is triply multiplexed in that
 (a) each msec, which represents 1023 bits of C/A code, is sliced into 186 to form the 186 segments in a msec of sample so that only 11 half chip wide sample bits are processed at one time;
 (b) each segment is then multiplexed by 12 so that each such 11 bit sample is rotated for twelve different sources;
 (c) the rotated 11 bit sample for each source is correlated against 20 sets of different code delays for that source to multiplex within each channel by 20; and
 (d) the sum of the correlation products for each delay in each channel are then summed to produce the accumulated correlation output.

Although 22 different delays are available, it is convenient to use 20 such delays, or code phase theories for testing the rotated satellite signal. The correlation product having the greatest magnitude for each channel after accumulation, that is, the largest of the 20 sums of 11 bits stored in Accumulator Block 115 for each channel may then be detected by its magnitude, for example by a peak detector, to determine which delay theory is the most accurate. The peak sum represents the on-time or prompt correlation for that SV.

Turning now specifically to FIG. 11, the triple multiplexing scheme of the present invention may easily be understood by looking at the slices of time resulting from each of the multiplexing operations. Within each msec, the C/A code for each particular satellite has 1023 bits. In order to preserve all necessary information, the satellite signals are sampled, in a digital composite of signals from all satellites, at the Nyquist rate at $2f_0$ to produce 2046 half chip wide sample bits.

Each sequential set of eleven sample bits are processed together as a segment of time, the length of which is equal to $1/(2046 \div 11)$ of a msec, i.e. one $\frac{1}{186}$th of a msec. After processing of the 186th segment in a msec all necessary data has been extracted and the 11 bit sample for the next segment is available. Although the partial sums accumulated over each msec in Accumulator Block 115 may only be evaluated at the end of a msec, no data is lost and the results are only 1 segment late. That is, since it takes 1 segment to fill 11 sample deep buffer 120 and transfer the 11 bit sample to parallel block 122, the data from the first 11 bit sample is being processed while the data for the second 11 bit sample is being collected. Even if the system operated for a year, the sampled being processed to provide position information is still only one time segment old.

The 11 bits of each segment are multiplexed for each SV by being time division multiplexed during doppler rotation. That is, the 11 bit sample of segment 1 is used to provide 12 different doppler shifted outputs so that a single 11 bit segment sample is used 12 times to produce 12 different satellite specific doppler rotated versions, assuming all 12 satellites are in view or being modeled. The operations for one channel then require one twelfth of a segment. It is critical to note that each segment only produces a partial result and that the 12 partial results during each segment must be summed at the end of each msec to provide valid output data.

Each of the operations on one particular channel in a segment are time division multiplexed by a factor of 22 so that 22 different code delays for that partial sum for that satellite can be tested. The peak sum of these 22 correlations can however be detected by magnitude immediately if necessary to select the most likely delay for that channel. In the present embodiment, the information for that channel is only valid once per msec when summed or accumulated so that there may not be a substantial advantage in peak detected with a particular segment. In some GPS applications and in other spread spectrum applications, such as wireless communications, it may be desirable if strong signals are present to accumulate and transfer the sum of the accumulations for each source from R3 to R4 more often than once per code repetition rate. The time required to evaluate a particular code phase delay or theory is only $\frac{1}{22}$nd of the time required per channel per segment or $\frac{1}{22}$nd of $\frac{1}{12}$ of $\frac{1}{186}$th of a msec. This speed of operation is more easily achieved because the 11 one bit correlations required are produced in parallel. Similarly, the speed of generation of the different code delays for a particular SV is more easily accomplished in accordance with the present invention because each 11 bit code delay sample is automatically produced when each single new bit, i.e. each new genSerOut 160, is shifted into Code Shift Register 170.

The selection of the magnitudes or multiplexing factors used in each level of multiplexing is not arbitrary. The larger the number of segments, the smaller the required size or depth of the registers need for each sample. By using a code repetition multiplexing factor of 186, that is, by dividing the 2046 bits of a $2f_0$ by 186, only 11 sample bit, need to be evaluated at a time.

The number of required channels is bounded pragmatically by the fact that at least 4 Svs must be in view at the same time to determine position accurately in three dimensions. Time is the fourth unknown which must be determined along with each of the three dimensions although provisions for estimating, modeling and/or updating the position information as described above so that position information may be accurately provided even during periods when less than 4 satellites are concurrently in view.

The constellation of 24 NAVSTAR satellites in use are arranged to cover the earth so that a maximum of 12 such satellites may be in view at any one location at any particular time. The maximum number of pragmatically useful channels is, for this reason, no less than about 12 channels. The selected channel multiplexing factor used in the channel level of multiplexing in the embodiment shown herein is therefore a factor of 12.

The number of different code delays is bounded at the low end by an absolute minimum of 1 so that if the exact delay can somehow be maintained, the only necessary correlation would be the on-time or prompt correlation. Conventional GPS receiver systems use at least 2 or 3 different code delays so that conventional tracking techniques, for example those which use early, prompt and late correlations to center the prompt correlation within ±1 delay, may be employed.

In accordance with the present invention, a substantially greater number of different code delays, or delay theories, are tested so that fast reacquisition may be accomplished as described above with regard to FIGS. 3 and 4. Although for the particular preferred embodiment described herein, it was determined that a total of 20 different delays, each separated in time by one half the width of a C/A code chip, i.e. ½ of $\frac{1}{2046}$ of one msec, a code delay multiplexing factor of 22 was selected because the relationship between each of the 3 multiplexing factors is also important.

The product of the three multiplexing factors, code repetition multiplexing factor, channel multiplexing factor and code delay multiplexing factor should optimally be an even integer multiple of the number of bits in each repetition of the spread spectrum modulation. An even integer multiple is required because samples must be taken at twice the chip rate, i.e. at the Nyquist rate, in order to avoid data loss from sampling at a slower rate. Although multiplexing factors can be used successfully even if the product is not exactly equal to an even integer multiple, data loss or unnecessary complexity and costs may result.

In the particular embodiment shown, the spread spectrum code of interest is the C/A code, each repetition of which includes 1023 bits. In accordance with the triple multiplexing product rule discussed above, the product of the three multiplexing factors must equal an even integer multiple of 1023, such as 2046. In the described embodiment, the code repetition multiplexing factor is 186, the channel multiplexing factor is 12 and the code delay multiplexing factor is 22. The product of 186 multiplied by 12 and then by 22 is 49104 which, when divided by 1023, equals 48. 48 is an even integer and therefore the particular set of multiplexing factors used in the present invention provides one of several optimized systems.

The reason this multiplexing factor product rule works well in a trilevel multiplexing configuration for C/A code is that there are three prime factors in 1023. That is, 1023 is the product of three prime numbers, 31, 11 and 3. Each of the three multiplexing factors is evenly divisible by one of these prime numbers. For example, 186 is divisible by 31 six times, 12 is divisible by 3 four times and 22 is divisible by 11 twice.

Using each prime factor of the number of bits in the sampled bit rate in one of the multiplexing factors yields two or more different families of multiplexing configurations for C/A code spread spectrum receivers. In the first family, if 11 channels are desired, then either the code repetition multiplexing factor or the channel multiplexing factor would have to be divisible by 31. Although it may be desirable in certain applications to use 31 or 62 different code delays, there is a substantial advantage in making the code repetition multiplexing factor as large as possible. This reduces the number of bits required to be saved and processed in each segment. By selecting the code repetition multiplexing factor to be a multiple of 31, the number of delays actually used can be more easily controlled because the code delay multiplexing factor could be any multiple of 3.

In the other convenient family, 6, 9, 12, 15 or 18 satellite channels are desired so that the channel multiplexing factor is an integral multiple of 3. This permits the code delay multiplexing factor to be a factor of 11 while the code repetition multiplexing factor is a factor of 31. The particular embodiment described in the specification above is in this family.

Another constraint on the selection of multiplexing factors is the speed of operation of the lowest level of multiplexing. In the embodiment disclosed, the third level of multiplexing operates at $48f_0$. The clock speed of the hardware implementation must be sufficient to permit operation at this speed. As faster and faster on chip components are developed, higher clock speeds may be used to accomplish the highest speed processing and larger multiples may be used. For example, with components in the high speed processing sections such as Correlator Block 110 capable of operation at higher rates at multiples of $f_0$, such as at $96f_0$, the code repetition multiplexing factor could be doubled to produce 24 channels with 20 delays or taps or 12 channels with 40 delays or taps or 11 channels with 6 bits and 22 taps.

The system configuration may also be viewed from the standpoint of a time or speed magnification. Operation at the third multiplexing level at $48f_0$ is 24 times faster than the chip rate of the $2f_0$ sample being processed. This amplification factor of 24 permits a hardware multiplexing or gate compression factor of 24. The number of gates on ASIC 102, or other devices for implementation the present invention, is reduced essentially in direct proportion to the magnification factor. All other factors being equal, the surface area of a chip operated at $48f_0$ is on the order of $\frac{1}{24}$th of the surface area that would be required to operate at $2f_0$. Similarly, an increase in the magnification factor to 96 would permit a reduction in the required chip surface real estate required on the order of almost half.

The particular embodiment of the multiple level multiplexing spread spectrum receiver of the present invention which has been disclosed above is a GPS receiver. The same invention can be used for other spread spectrum signals such as wireless telephone signals with due consideration for the selections of multiplexing factors based on the bit rate of the spread spectrum code used and the environmental factors applicable to that application. The environmental factors for the present configuration, such as the pragmatic constraints on the number of channels and code phases, have been described above.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A method of tracking a spread spectrum source, comprising the steps of:
   acquiring the source from a composite of signals received by determining a delay parameter for that source related to time of receipt of a source specific spread spectrum code in the signals from the source;
   correlating signals received from the source with a prompt version of a locally generated source specific code based on the delay parameter;
   tracking the signals received from the source by updating the delay parameter in response to the signals from the source;
   modeling the delay parameter to continue updating the delay parameter when signals from the source are not being tracked; and
   continuously correlating the composite of signals received with a plurality of delayed versions of the locally generated source specific code based on the modeled delay parameter to reacquire the signals from the source.

2. The method of claim 1 wherein the step of correlating the signals from the source further comprises the step of:
   correlating the signals received from the source with an early and a late version of the locally generated source specific code based on the delay parameter to adjust the delay parameter; and the step of continuously correlating the composite of signals received further comprises the step of:
   correlating the composite of signals received with a plurality of versions of the locally generated source specific code different from the early or late version used.

3. The method of claim 2 wherein the early and late versions of the code are each separated from the prompt version by a multiple of a fixed delay.

4. The method of claim 3 wherein each of the plurality of versions of the locally generated source specific code are separated from the prompt version by multiples of the fixed delay different than the multiple used for the early and late versions.

5. The method of claim 4 wherein the fixed delay is related to the chip width of chips in the source specific code.

6. The method of claim 5 used for tracking GPS satellites, wherein the fixed delay is a fraction of a C/A code chip.

7. A spread spectrum receiver, comprising:
   means for providing a plurality of versions of a locally generated signal related to a spread spectrum signal to be received;
   means for combining at least two of the versions of the locally generated signal with the spread spectrum signal to produce a product signal related to each of the at least two versions;
   means for evaluating the at least two product signals to adjust a parameter of a third version of the local signal;
   means for combining the adjusted third version of the local signal with the spread spectrum signal to produce a data signal;
   means for determining a predicted value of the parameter when the spread spectrum signal becomes unavailable;
   means for combining an additional plurality of versions of the locally generated signal related to the predicted value with received signals to produce additional product signals related to each of the additional plurality of versions of the locally generated signal; and
   means for evaluating the additional product signals to produce a reacquired data signal.

8. The invention of claim 7 for use with GPS satellites, wherein:
   the spread spectrum signal is a composite of signals received from a plurality of GPS satellite;
   the locally generated code includes satellite specific C/A codes;
   the third version of the local signal is a prompt version of the code; and
   the additional plurality of versions of the satellite specific C/A codes are separated from the prompt version by positive and negative multiples of a fixed delay.

9. The invention of claim 8 wherein the separation in time from the most positive multiple to the most negative multiples of the C/A codes provide a capture window in time sufficient to include accumulated modeling errors accrued during motion of the receiver.

10. The invention of claim 7 wherein the time required to reacquire is sufficiently short to take advantage of gaps in obstructions causing unavailability of the signals from satellites resulting from the relative motion the receiver and the obstructions.

11. A method of operating a receiver for coded GPS signals from satellites comprising the steps of:

correlating early, prompt and late versions of a locally generated model of the code with signals received from GPS satellites to adjust a delay of the prompt version to track a selected satellite;

maintaining a predicted value of the delay when the selected satellite is unavailable;

correlating a plurality of different early versions of the locally generated code, early with respect to the predicted value of the delay, with signals received from satellites to produce correlation products;

correlating a plurality of different late versions of the locally generated code, late with respect to the predicted value of the delay, with signals received from satellites to produce correlation products; and reacquiring the previous unavailable selected satellite by selecting the version producing the largest correlation product above a predetermined threshold.

* * * * *